United States Patent [19]

Beighle

[11] Patent Number: 5,694,743
[45] Date of Patent: Dec. 9, 1997

[54] BOOK/DISC PRODUCT AND METHOD OF MAKING THE SAME

[76] Inventor: Douglas J. Beighle, 13422 SE. 43rd St., Bellevue, Wash. 98006

[21] Appl. No.: 693,516

[22] Filed: Aug. 2, 1996

Related U.S. Application Data

[60] Provisional application No. 60/002,337, Aug. 15, 1995.
[51] Int. Cl.$^6$ ................................................. B65B 35/54
[52] U.S. Cl. .......................... 53/445; 53/447; 53/468; 53/469; 53/167; 206/232; 412/6
[58] Field of Search .................... 281/38; 402/79; 412/6, 33, 36; 53/154, 155, 167, 254, 284.3, 445, 447, 455, 460, 468, 469, 562, 564, 568, 569, 570; 206/311, 232

[56] References Cited

U.S. PATENT DOCUMENTS

| | | | |
|---|---|---|---|
| 2,580,141 | 12/1951 | Vidal | 206/232 |
| 3,145,026 | 8/1964 | Shaw | 206/232 X |
| 4,199,061 | 4/1980 | Harkleoad et al. | 206/232 |
| 4,549,658 | 10/1985 | Sfikas | 402/79 X |
| 4,765,462 | 8/1988 | Rose | 206/232 X |
| 4,850,731 | 7/1989 | Youngs | 206/311 X |
| 4,852,740 | 8/1989 | Sellar et al. | 402/79 X |
| 5,147,036 | 9/1992 | Jacobs | 206/232 |
| 5,193,681 | 3/1993 | Lievsay | 206/311 X |
| 5,199,743 | 4/1993 | Rosinski | 281/38 X |
| 5,207,717 | 5/1993 | Manning | 206/232 |
| 5,275,438 | 1/1994 | Struhl | 206/232 X |
| 5,290,118 | 3/1994 | Ozeki | 402/79 |
| 5,445,265 | 8/1995 | Herr et al. | 206/232 X |
| 5,449,066 | 9/1995 | Calhe | 206/232 |
| 5,484,054 | 1/1996 | Kryszewski | 206/232 |
| 5,501,326 | 3/1996 | Shuhsiang | 206/232 X |
| 5,501,540 | 3/1996 | Ho | 281/38 X |
| 5,561,962 | 10/1996 | Everhard et al. | 53/570 X |

*Primary Examiner*—Daniel Moon
*Attorney, Agent, or Firm*—Robert B. Hughes; Hughes, Multer & Schacht

[57] ABSTRACT

A method of providing a book/sleeve/computer disc product, where the disc is inserted into an open end of a pre-made sleeve to form a sleeve/disc package, which is then directed through a conventional binding operation to form the book/sleeve/computer disc product. More specifically, a sleeve blank is provided, and is then folded and glued to form a pre-loaded sleeve into which the computer disc is inserted. The sleeve/disc package is placed into a gathering line along with signatures or page groups which are assembled into a book block, with the sleeve/disc package being part of the book block. This is bound (either glued or stitched), and trimmed to form the finished product.

21 Claims, 19 Drawing Sheets

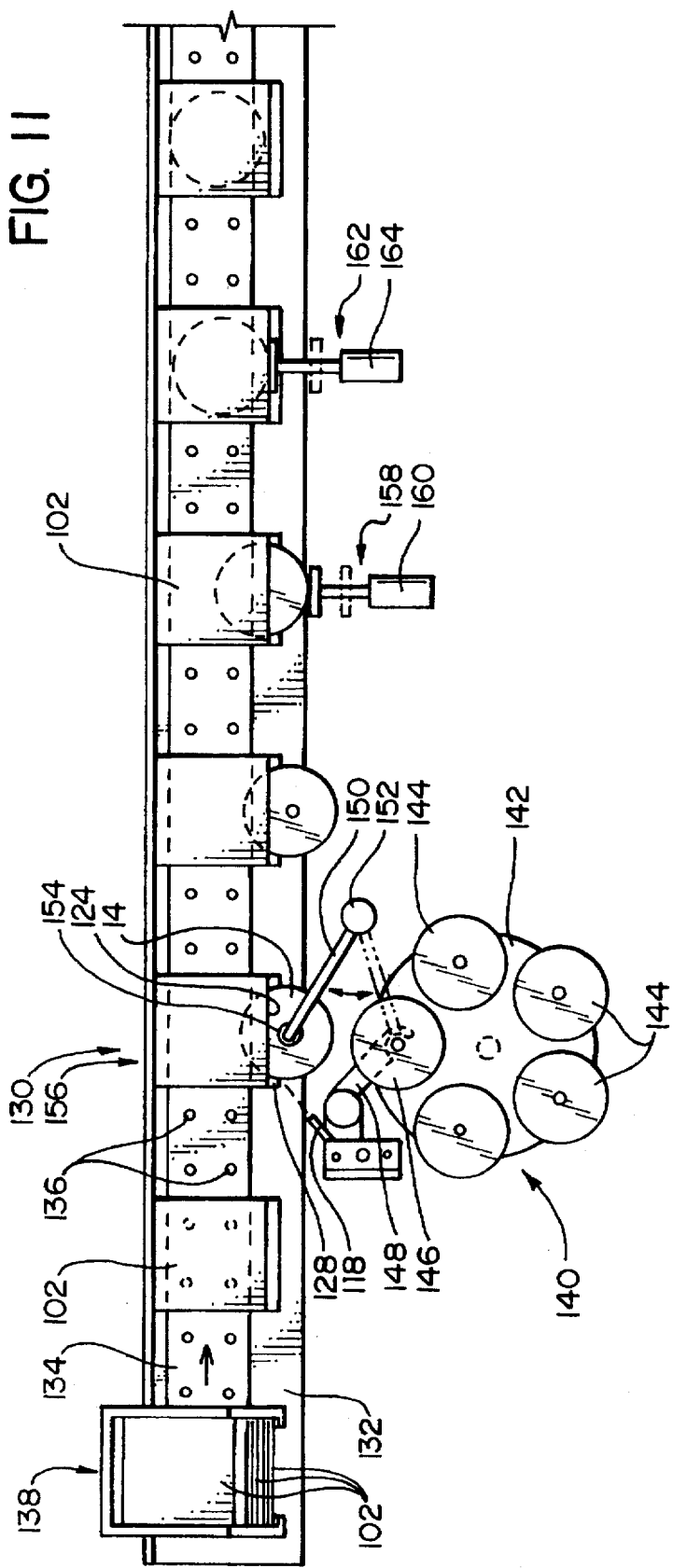

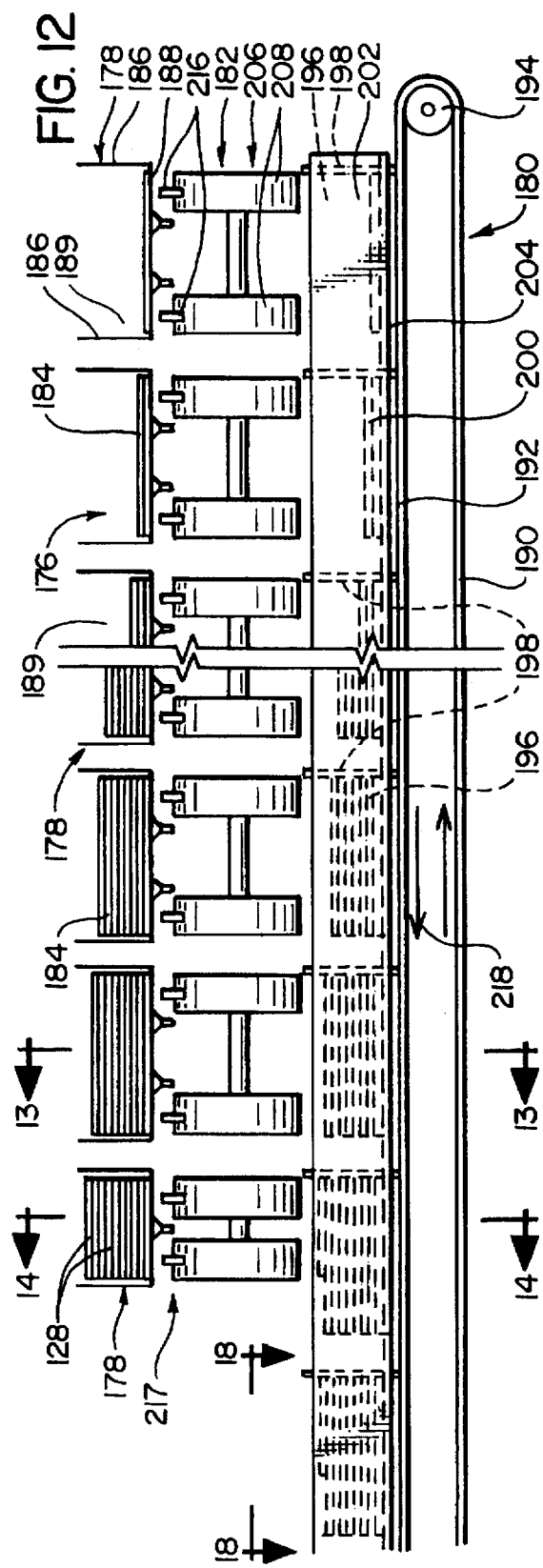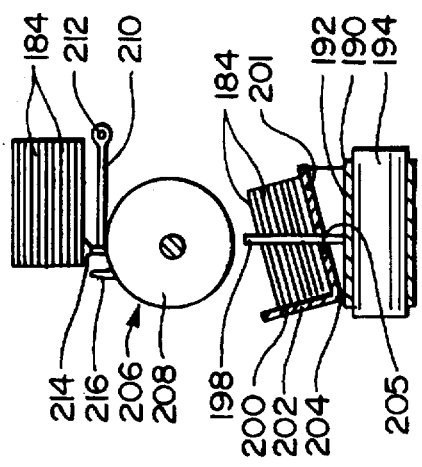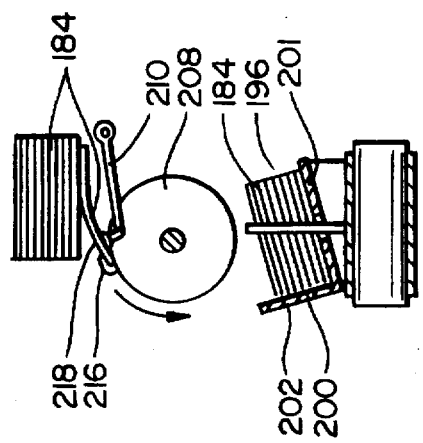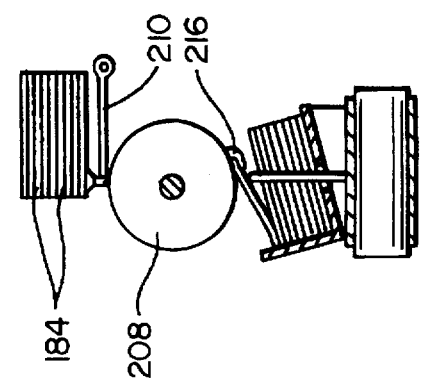

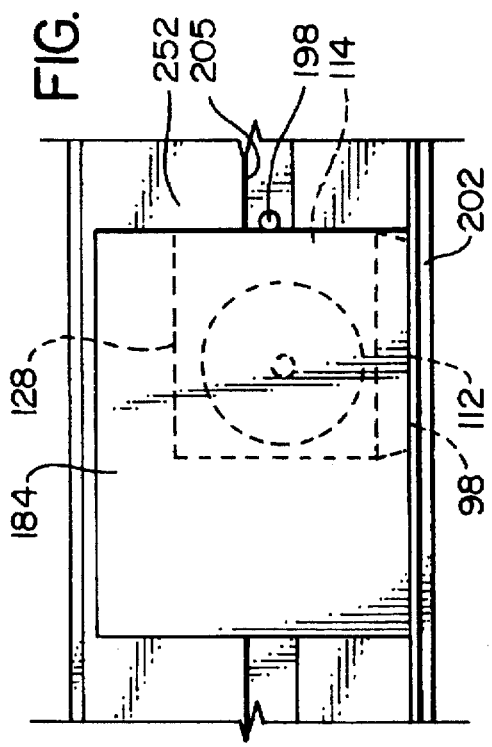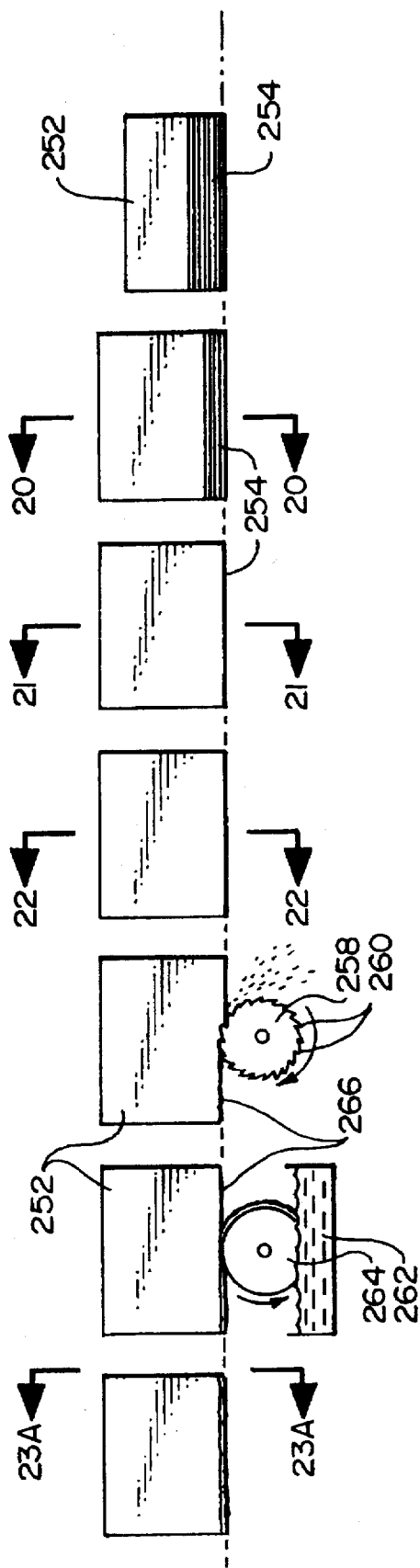

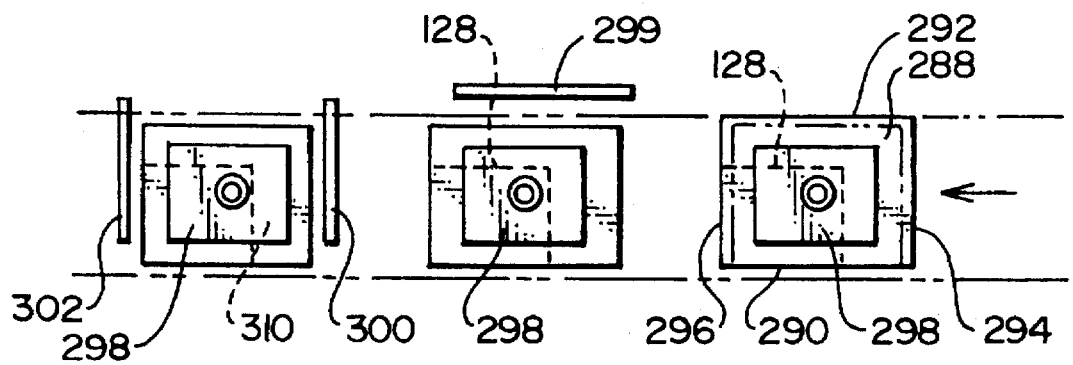

BOOK/DISC PRODUCT AND METHOD OF MAKING THE SAME

CROSS REFERENCE TO RELATED APPLICATIONS

This application claims the benefit of the priority date of U.S. Provisional Application 60/002,337, filed Aug. 15, 1995, entitled "BOOK/DISC PRODUCT AND METHOD OF MAKING THE SAME" now abandoned.

BACKGROUND OF THE INVENTION a) Field of the Invention

The present invention relates to a combination of a book (including a magazine) with a sleeve containing a computer disc mounted therein, and more particularly to a book having a perfect type of binding (which is intended to include a case binding), or a stitch binding and a method of providing a containing sleeve with a disc or diskette therein which is incorporated in the binding of the book, this being done in a manner that is compatible with use of present day automated methods and machinery designed for making such bindings.

b) Background Art

It has become increasingly common to provide a computer disc or diskette along with a book, as a single unit. One way of doing this is simply to place the disc or diskette against the outer cover of the book and shrink wrap these as a unit. Another method is to place the computer disc or diskette in an envelope or sleeve and in turn fasten this into the book by use of glue, an adhesive strip, or some other means. This usually involves a separate packaging operation, and this is often accomplished manually.

The applicant is also aware of a method of placing a disc in a book where there is first provided an empty envelope with a pair of open pockets. An open sealable flap is provided at the open end of the pockets. At the opposite edge of the envelope, the two layers of the envelope are bonded together along an edge portion. At a side edge portion of the envelope, the envelope has an edge portion approximately a half an inch wide that is bonded together. During the book making process, this envelope is incorporated as a page in a book block which then goes through the book binding process of grinding the spine portion of the block applying glue and an outer cover, and then trimming the three edge portions to make a finished book. After this, the disc or discs are placed in the two open pockets of the envelope, and the envelope sealed. To the best knowledge of the applicant, this final step of placing the disc in the envelope page of the book is done manually, or at least as a separate operation after the entire book is assembled.

BRIEF DESCRIPTION OF THE DRAWINGS

FIG. 11 is a somewhat schematic top plan view showing an apparatus (and the operation thereof) to accomplish the task of inserting the computer disc into the envelope or sleeve;

FIG. 12 is a somewhat schematic side elevational view showing a gathering line where the method of the present invention is incorporated to form a book block having a sleeve/disc combination incorporated therein;

FIGS. 13A, 13B and 13C are sectional views taken along line 13—13 of FIG. 12, showing the sequence in the transfer operation in the gathering line;

FIG. 18 is a top plan view taken along line 18—18 of FIG. 12, showing the assembled book block incorporating the disc/sleeve combination;

FIGS. 19A through 19G are schematic side elevational views showing in sequence the manner in which a book block is positioned in traveling through the grinding and glue application steps in forming the product of the present invention;

FIGS. 24A through 24C are a series of somewhat schematic plan views showing the manner in which the final trimming of the book is accomplished;

FIG. 25 is a semi-schematic side elevational view illustrating the manner in which the completed book block and cover are trimmed, prior to being clamped;

FIG. 26 is a view similar to FIG. 25, but showing the book block and cover clamped and the cutting operation being accomplished;

SUMMARY OF THE INVENTION

Figure 1:
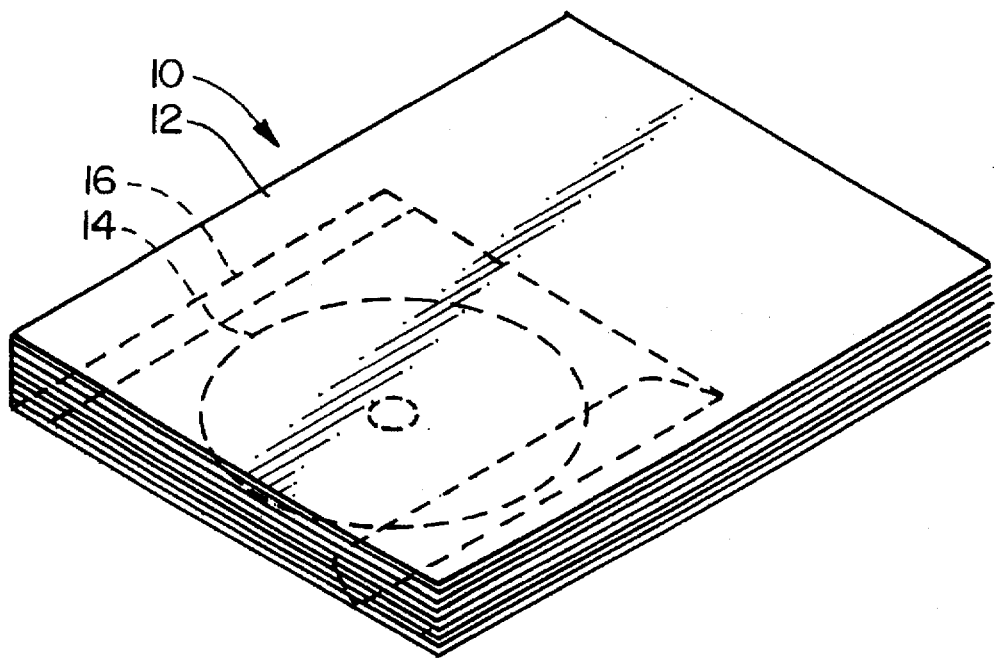
FIG. 1 is an isometric view showing the book/disc combination of the present invention having a CD disc mounted in a sleeve incorporated into the book.

The present invention relates to a method of providing a "book/sleeve/disc combination", where the disc is positioned in a sleeve which is in turn bound into the book portion of the combination. A significant aspect of the present invention is that it combines three different operation or process components in a manner that the overall process lends itself to the use of prior art automated machinery or systems, which can readily be adapted, with minor modifications at most, to the present invention. Further, the present invention enables each of the various component processes to be accomplished in a substantially independent manner, so that in a very short timeframe after an order is received, the overall process can very promptly be put into operation so that the book/sleeve/computer disc product can be in full production in a very short time.

In the method of the present invention, the end product comprises a book, comprising a plurality of pages forming a book block having an inner binding edge portion, an outer edge portion opposite the binding edge portion, an upper edge portion, and a lower edge portion. The pages are joined to one another at the binding edge portion of the book block.

There is a sleeve comprising a base ply and a cover ply joined together at perimeter portions thereof to form a pocket. The sleeve has a binding edge portion, an outer edge portion, an upper edge portion, and a lower edge portion. The binding edge portion of the sleeve portion being joined to book block at the binding edge portion of the book block.

Then there is a computer disc contained in the pocket of the sleeve.

The method comprises first providing a plurality of preloading sleeves having the base ply and the cover ply joined together in overlying relationship, with at least one edge portion being an open edge portion. Then there is provided a plurality of computer discs, and also a plurality of prebound book pages having binding edge portions.

Each computer disc is inserted through the open edge portion of a related preloading sleeve and positioned in the pocket of the related preloading sleeve to form one of a plurality of sleeve/disc packages, each of which has a binding edge portion.

The prebound book pages are placed in an automated binding machine assembly in a pregathering position. Also, the sleeve/disc packages are placed in the binding machine assembly in a pregathering position.

The machine assembly is then operated to gather the prebound book pages and the sleeve/disc packages together in a book block and sleeve/disc package combination and to join the binding portions of the prebound book pages and the sleeve/disc package to form the plurality of book, sleeve and computer disc products.

Thus, the preloading sleeves, the discs, and the book pages can be produced independently of one another and combined with one another in an automated assembly of a book binding operation.

In one embodiment, the book pages and the sleeve disc package are bound to one another in a binding operation by adhesive being applied to the binding edge portions thereof.

In another embodiment, the prebound book pages and the sleeve/disc package are joined together by forming the pages so that pairs of the pages are formed as one sheet which has a middle binding portion interconnecting the two pages of the pairs. These sheets are bound together at the binding portion in a stitch binding. The sleeve/disc package has a disc containing portion and a counter-balancing portion joined together by a binding portion. The binding portion of the sleeve/disc package is bound to the binding portions of the sheets.

In a preferred version of the method, prior to inserting the discs into the preloading sleeves, the preloading sleeves are formed by providing a paper blank having two ply sections. Adhesive is applied to at least one of the ply sections, and the ply sections are folded against one another to bind edge portions of the ply sections to one another and form the pocket of the preloading sleeve. Also in the preferred form, at least one of the ply sections has an access and closure flap adjacent to the open edge portion. After the disc is inserted into the preloading sleeve, the access and closure flap is closed over the open edge portion.

Also in the preferred form, the access and closure flap has a moisture sensitive or pressure sensitive adhesive applied over an adhesive area of the access and closure flap. The discs are inserted into the preloading sleeves by providing the preloading sleeves in a stack, and directing the preloading sleeves sequentially to a preloading area where the discs are inserted into the preloading sleeves. After this, the access and closure flaps are sealed by folding the access and closure flaps against the preloading sleeve.

In one preferred embodiment of the method, the ply sections are folded against one another along a fold line to make a folded edge portion. The folded edge portion of the preloading sleeve in this particular embodiment functions as a binding edge portion and is bound to the book pages. Also in that preferred form, in one version, the ply sections are formed with tear lines positioned adjacent to, but spaced from, the fold line. Thus the sleeve in the book/sleeve and computer disc product can be separated from the binding edge portion of the sleeve. Also, adhesive is applied adjacent to the two tear lines, at a side of the two tear lines opposite from the fold line. Thus when the sleeve of the book, sleeve and computer product is removed, ply portions adjacent to the tear line remained joined to one another to retain the disc in the pocket. In one version, the open edge portion of the preloading sleeve is positioned on an opposite side of the preloading sleeve from the full bind portion, in a manner that in the book, sleeve and computer disc product, the access and closure flap is located at the outer edge portion of the book block.

Also, in the preferred form, an edge portion of the sleeve/disc package, other than the binding edge portion, has a trimmable foot portion extending beyond the perimeter edge portion. The method further comprises forming a trimmable operation on the book block and the sleeve/disc package combination to remove the trimmable foot portion during a trimming operation.

Also in various configurations of the sleeve, the sleeve/disc package interconnects by means of a release line portion along which the sleeve/disc package can be separated from the binding edge thereof.

In some embodiments of the sleeve, at least one perimeter edge portion of the sleeve in the sleeve/disc package is provided with a release line section which permits adjacent portions of the sleeve to be separated from one another to open the pocket, so that the disc can be removed from the pocket.

In some embodiments, the sleeve in the sleeve/disc package has one of the perimeter edge portions of the sleeve provided with a release flap which is connected to one of the base ply and cover ply portions and is adhesively bounded to an adjacent edge portion of the other of said base ply portion and cover ply portion. The release flap has at least one release line by which the flap can be separated to provide an opening to said pocket, with portions of the sleeve adjacent to said release line defining the opening to the pocket. In one preferred form, the release line comprises two spaced tear lines defining therebetween a tear strip. The portions of the sleeves adjacent to the release line are separated from one another by removing the tear strip along the two lines from the sleeve to provide the opening to the pocket.

In the process of assembly the pages, in a preferred embodiment, the pages are assembled by placing the pages at spaced pocket locations along the gathering line and also placing the sleeve/disc package at one of the pocket locations. Collecting locations are moved along the gathering line, and the pages are moved from the pocket locations onto the collecting stations as the collecting stations move by the pocket locations. The sleeve/disc packages are moved from their pocket location and are located onto the collecting locations to form the block and disc/sleeve combinations. In one embodiment, the book block and the sleeve/disc package are moved to a grinding location where spine edge portions of the related book block and sleeve/disc combinations are ground, and a bonding agent is applied to a ground spine edge portion of the book block and sleeve disc combinations.

In a preferred embodiment, the pages of the book block are removed from the pocket locations to the collecting locations by engaging pages at the pocket locations by a transfer member which pulls the pages while rotating the pages through an angular path of travel to deposit the pages at the collecting stations. The method further comprises moving the sleeve/disc packages by engaging the sleeves by one of the transfer members and moving the sleeve/disc package angularly to the collecting stations.

In a preferred configuration, the pocket location at which the sleeve/disc package are positioned has a bottom wall which slants from a horizontal alignment toward said one of the transfer members in a manner that the sleeve/disc package being removed from the pocket travels in substantial alignment with the bottom wall of the pocket at which these sleeve/disc packages are positioned.

Also, in configurations of the book block and sleeve/disc package combination, the book pages extend beyond the disc in the sleeve. The method further comprises performing an edge trimming operation on the book block and sleeve/disc package combination by placing the book block and sleeve/disc package combination onto a base plate, with filler plate means positioned in a plane parallel to the disc in the book block and sleeve/disc combination. Thus, the book block is positioned uniformly along a horizontal plane, thus facilitating the trimming operation.

Also, the present invention comprises a book, sleeve and computer disc product made according to the method of the present invention.

Other features of the present invention will become apparently from the following detailed description.

DESCRIPTION OF THE PREFERRED EMBODIMENTS

I. FIRST MAIN EMBODIMENT—PERFECT BINDING PROCESS a) Introduction

In FIG. 1, there is shown the finished end product 10 of the first main embodiment of the present invention, comprising a "book/sleeve/disc combination", and comprising a book 12 having a perfect binding. (In the present invention, the term "perfect binding" is used in a broader sense to include not only the binding where the spine edges of the book block are bonded directly to the spine of the cover, but variations of the same. For example, the binding could have a piece of fabric or crepe which is bonded to the spine of the book block and also the front and back covers, this often being called the "lay open" binding. Also, as indicated above, this is intended to include a case binding, or other binding having a similar basic configuration and/or incorporating similar manufacturing techniques in manufacturing the book.

Figure 2:
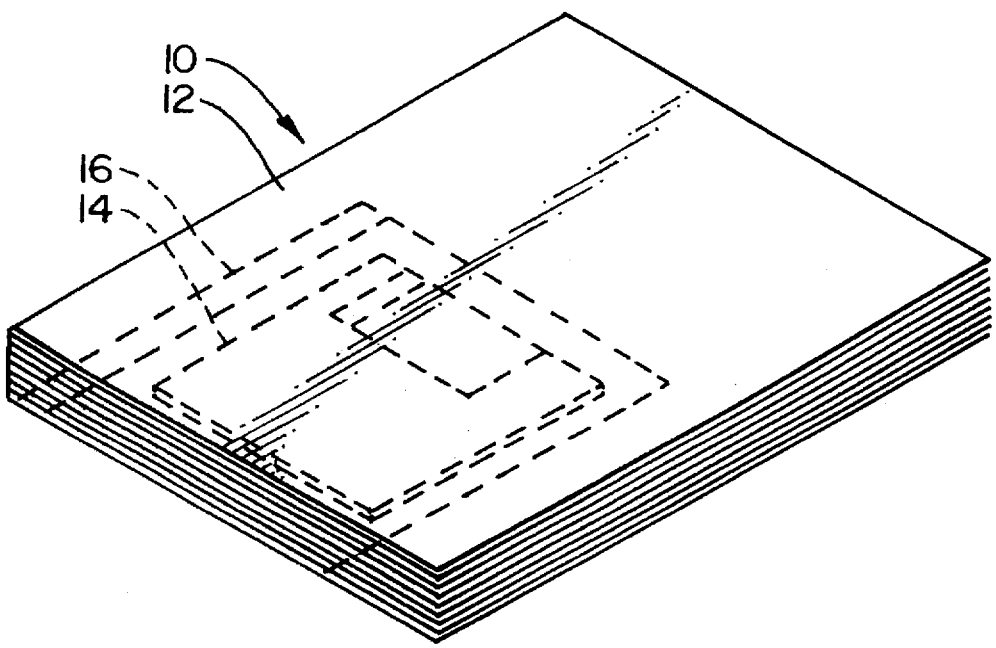
FIG. 2 is a view similar to FIG. 1, but showing a floppy diskette in the combination instead of a CD disc.

The disc 14 is a conventional disc having information encoded thereon, and in FIG. 1 this is shown as a CD disc. In FIG. 2, the same combination is shown, designated 10', and this differs from the combination shown in FIG. 1 in that the disc is a floppy diskette which is designated as 14' to differentiate this from the disc 14 shown In FIG. 1. The sleeve 16 contains the disc 14 and is positioned in the book 12 in the manner of a page which is part of the perfect binding.

A significant aspect of the present invention is that it combines three different operation or process components in a manner that the overall process lends itself to the use of prior art automated machinery or systems which can readily be adapted, with minor modifications at most, to the present invention. Further, the present invention makes it possible so that the various component processes of the present invention can be combined in a manner which is particularly compatible to the timing demands and other constraints which are imposed in the printing, book binding, and computer disc industries. Commonly, when an order to placed and to be filled in the printing/book binding industry, the time constraints can be very severe. One person in the industry stated the situation as follows, "When an order comes in, they usually want it delivered five days ago." Accordingly, delays and potential bottle necks in the system must be avoided.

In the following detailed description of the present invention, it will become apparent how each of the process components are structured in such a way that these can be combined in a particularly effective manner. Further, each of the process components in the overall process can be accomplished to meet the requirements of the overall process of the present invention without interfering with the present procedures and steps already practiced in the industry. This will become more apparent from the following detailed description.

b) Making the Sleeve 16

Figure 3:
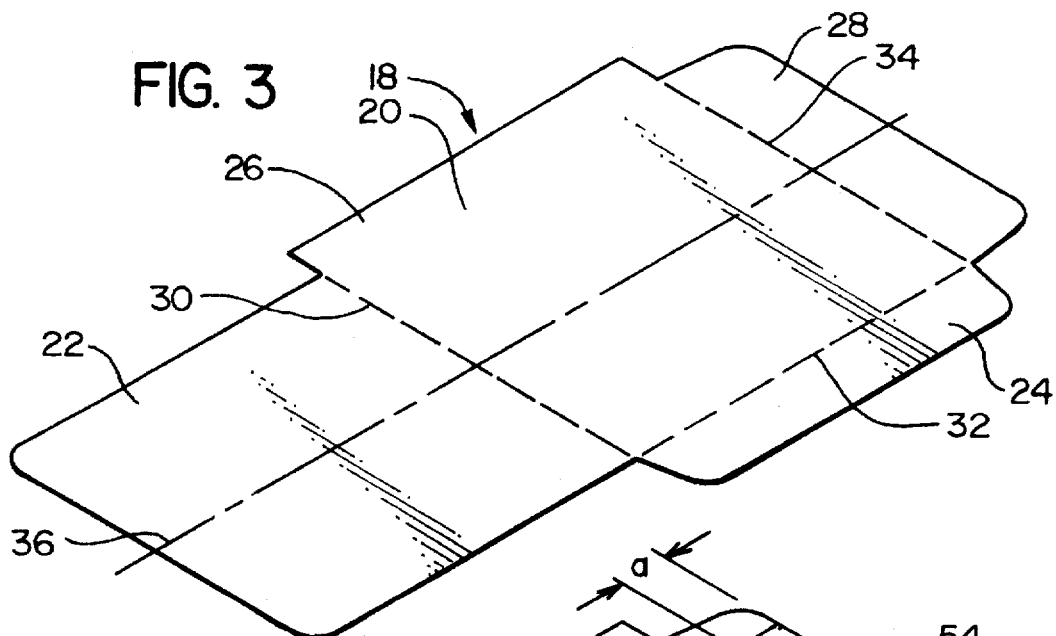
FIGS. 3, 4 and 5 are isometric views showing in sequence the manner in which a blank of paper is originally provided and then formed into a sleeve utilized in the present invention, having an opening leading into a pocket.

The making of the sleeve will be described with reference to FIGS. 3 through 7. In FIG. 3, there is shown a preformed blank 18 made from conventional paper stock, such as would be used as a page of a book, such paper stock could be up to 8 pt point board stock.

The blank 18 can be cut to the configuration shown in FIG. 3 by conventional means. This blank 18 can be considered as having five (5) portions, namely a rectangular base ply 20, a rectangular cover ply 22, a gluing flap 24, a trim flap portion 26, and a closure and access flap 28.

The base ply 20 and the cover play 22 join to one another about a fold line 30. When the cover ply 22 is folded over onto the base ply 20 along the fold line 30, the fold line 30 becomes the inner edge of the completed sleeve which is adjacent to the spine of the book into which the sleeve is bound.

The bonding flap 24 joins to the base play 20 about a fold line 32, which in the end configuration will be the upper edge of the completed sleeve when the sleeve is placed in the book. The flap portion 26 is a trim flap, and when the sleeve is completed, this flap 26 will comprise part of the trim foot which is trimmed off in the final cutting operation when the three trimmable edges of the pretrimmed book are finally cut. The closure and access flap 28 joins the base ply 20 along a fold line 34 which is parallel to the fold line 30. In the end configuration of the sleeve with the disc 14 contained therein, the flap 28 is folded over and sealed, and the flap 28 will be opened or torn loose to provide access into the interior of the sleeve to remove the computer disc 14 and/or replace the same.

Figure 6:
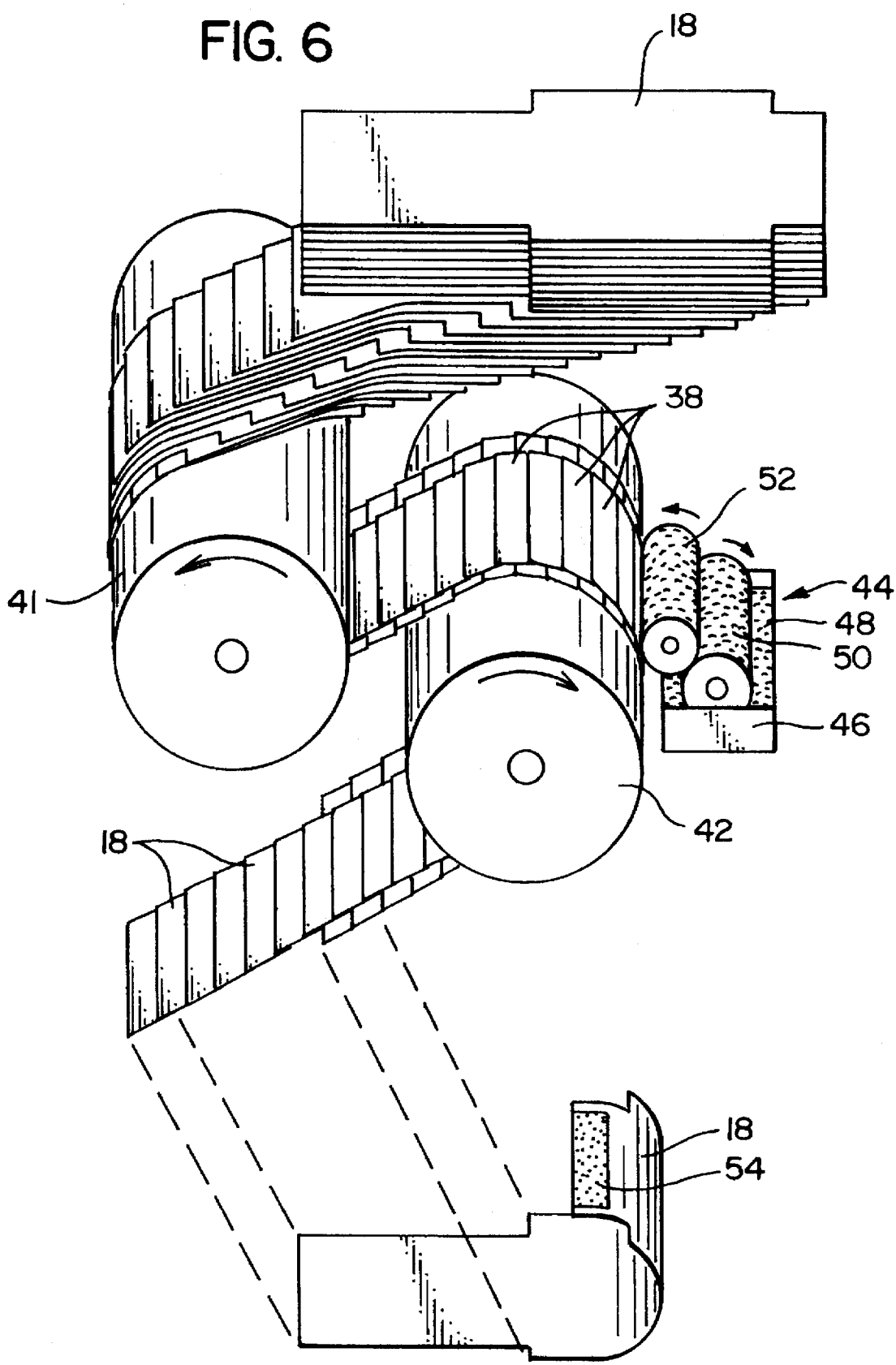
FIG. 6 is an isometric view showing somewhat schematically an automated system where a pressure sensitive adhesive or a moisture activated adhesive is applied to the blanks of paper as shown in FIG. 3.

The first step in forming the blank 18 into a sleeve is to apply an adhesive to the closure/access flap 28. The manner in which this is accomplished in an automated manner is illustrated in FIG. 6. In FIG. 6, there is shown somewhat schematically a stack of blank 18 which are stacked one on top of the other in a manner that these are somewhat staggered along a longitudinal axis 36 of the blanks 18 (see FIG. 3). The staggered distance between the blanks 18 is equal to the width dimension (indicated at "a" in FIG. 4) of the area 38 to which the adhesive is to be applied.

These blanks 18 are then directed through an apparatus 40 which already exists in the prior art. It is to be understood that the glue applying apparatus 40 is shown rather schematically, and components which are not necessary for an understanding of the method of the present invention are not disclosed. For example, there are various guide members or holding devices to properly control the precise movement of the blanks 18 through the process.

The blanks 18 are directed around a guide roller 41 and then directed to pass around a second roller 42 where there is an adhesive applicating assembly 44, comprising a container 46 containing the adhesive 48. There is a first pickup roller 50 which in turn applies the glue or adhesive to the applicator roll 52 that has a width dimension the same as the length dimension of the adhesive application area 38 (see FIG. 4).

Since the only exposed surface area of each blank 18 is that portion of the closure/access flap 28 that extends beyond the edge of the adjacent flap 28, and since the width of the roll 52 is equal to the width of the application area, the adhesive 48 ends up being applied only to the area at 38. This applied adhesive is indicated in 54 in FIG. 4. This adhesive layer 54 is either a moistenable adhesive (one that becomes adherent only when it is moistened) or a pressure sensitive adhesive (one that become adhesive only when an adequate pressure is applied to press the adhesive surface 54 against another surface).

Figure 4:
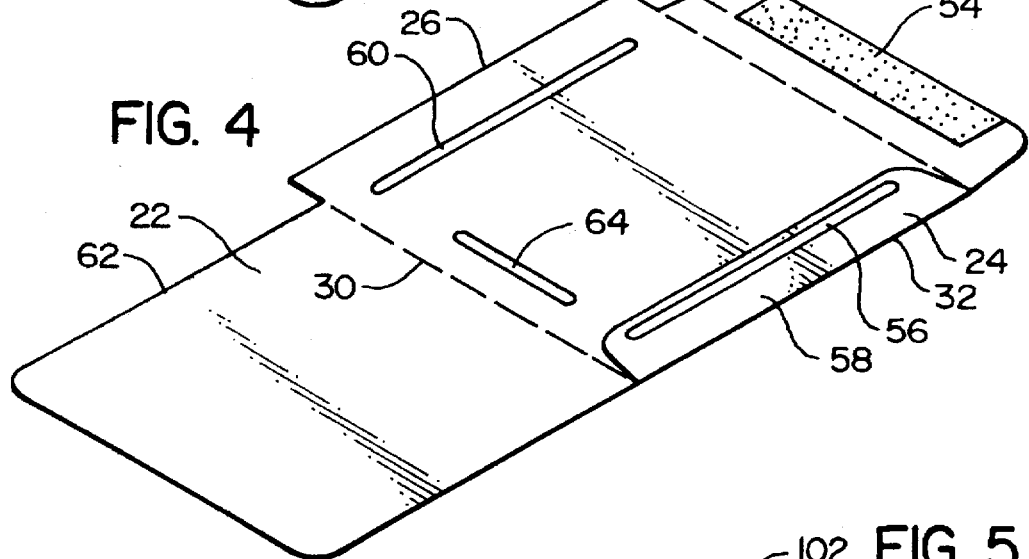

After the adhesive layer 54 has been applied and is permitted to cure, the next step is to apply glue strips to the blank 18 at the locations illustrated in FIG. 4. Prior to applying the glue, however, the glue flap 24 is folded over as shown in FIG. 4. Then a longitudinally extending glue strip 56 is applied to the upwardly facing surface 58 of the glue flap 24, and a second longitudinally extending glue strip 60 is applied parallel to the longitudinal axis 36 just a short distance inwardly to a line drawn parallel to the far edge 62 of the cover ply 22. In addition, there is a shorter transverse glue strip 64 applied to the upper surface of the base ply 20 at a location adjacent to, but spaced a short distance from, the fold line 30.

Figure 7:
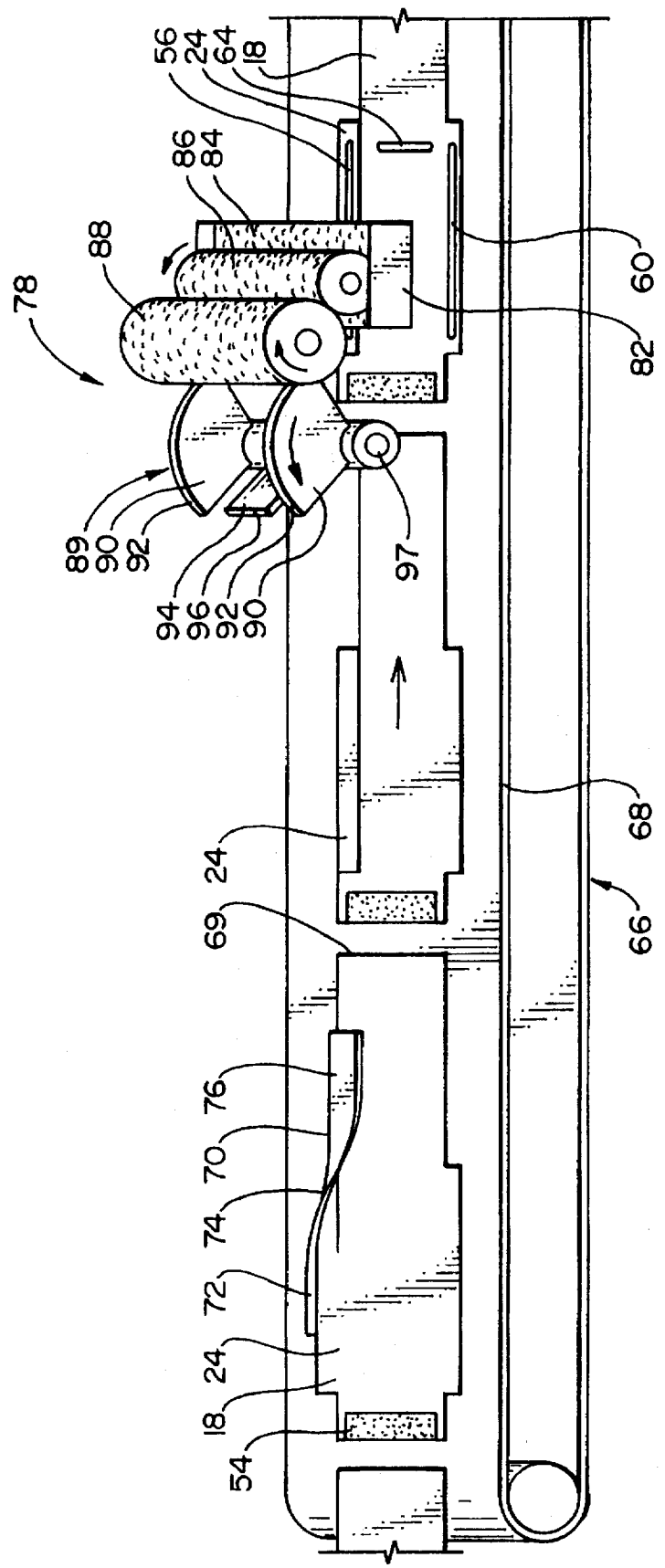
FIG. 7 shows somewhat schematically an apparatus to apply the additional adhesive to the blanks as shown in FIG. 4.

The manner in which this is accomplished in an automated fashion is illustrated in FIG. 7. In FIG. 7 there is shown a conveyor 66 having a continuous conveyor belt 68 on which the blanks 18 are positioned, spaced a short distance from one another, and longitudinally aligned. FIG. 7 is taken from a location above and off to one side of the belt 68. Thus, since the blanks 18 are shown at an angle, the lengthwise dimensions of the blanks 18 appear longer than the width dimensions, and it is to be understood that the dimensions of the blanks 18 are substantially shown in FIG. 3.

In FIG. 7, the blanks 18 move from left to right, and the adhesive area 54 is at the trailing end of the blank 18. The front end 69 of the blank 18 initially encounters a cam plate 70 which functions to fold the glue flap 24 over 180° to the position of FIG. 4. Thus, the cam plate 70 has a rear portion which extends horizontally below the flap 24 when it initially encounters the cam plate 70. The cam plate 70 twists a full 180° along its length, and thus has a transition portion 74 and a front end portion 76 which is immediately over and adjacent to the upper surface of the conveyor belt 68, to complete the folding of the flap 24 and press it against the upper surface of the main ply portion 20.

With the flap 24 pressed fully against the base ply 20, the blank 18 continues into the glue application area 78. This is a hot glue application, and there is a glue container 82 having the glue 84 therein, a pickup roller 86 continuously picks up glue 84 from the container 82 and applies this to the applicator roller 88. There is a rotating applicator 89, comprising two side members 90 which have respective arcuate surfaces 92 of the same length as the glue strips 56 and 60. Also, there is a middle glue applicator member 94 having a transverse applicator edge 96 having a length the same as the transverse glue portion 64. These three applicator components 90 and 94 are mounted to a shaft 97 that rotates continuously and in proper timed relationship with the travel of the conveyor belt 68. It can readily be seen that as the applicator 89 rotates, the edges 92 and 96 pick up glue from the roller 88 and thus apply the glue to form the glue strips 56, 60 and 64 (see FIG. 4).

The final steps in the sleeve forming process are to fold the cover ply 22 about the fold line 30 over on to the upper surface of the base ply 20, to bond the cover ply 22 to the base ply 20, and also to form the spine edge 98 of the sleeve, this spine edge 98 formally being the fold line 30. Also, perforations are made adjacent to the spine edge 98 (at a location spaced a short distance therefrom) through both ply sections 20 and 22 to form tear lines 100.

This completes the formation of the finished sleeve designated 102. The sleeve 102 is sealed on three sides, and a fourth side adjacent to the flap 28 remains open. The adhesive area 54 is, as indicated previously, either a pressure sensitive adhesive or a moisture sensitive adhesive. Thus, in the condition as shown in FIG. 5, the sleeves 102 can be stacked one on top of the other, without the adhesive surface binding any two sleeves 102 together.

Figure 5:
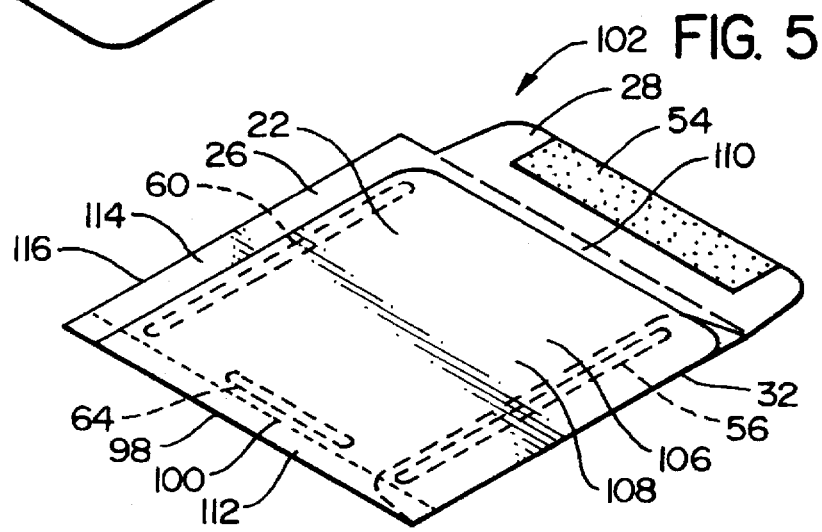

In the configuration, as shown in FIG. 5, the sleeve 102 can be considered as comprising four functional components. First, there is a pocket section 106 which defines a pocket 108 having an open end portion at 110, and enclosed along three sides at the bonding strips coinciding with the glue strips 60 and 64, and the folded edge 37. Next, there is the binding edge portion 112, which is that portion of the sleeve 102 between the edge 98 and the tear line 100. Then there is the closure and access flap 28 which remains in its position, extending outwardly from the base ply section 20. Finally, there is the trimmable foot portion 114 which is that portion of the sleeve 102 that extends approximately from the bottom glue line 60 to the edge 116 of the sleeve 102.

In the configuration of FIG. 5, the sleeve 102 is now arranged to receive the disc 14, and this will be described in the following section.

c) Inserting the Disc 14 into the Sleeve 102

This task can be accomplished in a automated system, and the steps of accomplishing this are shown in FIGS. 8 through 11.

The first step is to place the sleeve 102 at a loading station where the end opening 110 is facing toward a source of pressurized air, which is shown herein as an air discharge tube 118 having its discharge end 120 directed toward the opening 110. A stream of air is discharged from the tube end 120 to blow against the upper surface 122 of the closure and access flap 28 and into the opening 110 to raise the free edge 124 of the cover ply section 22.

Figure 9:
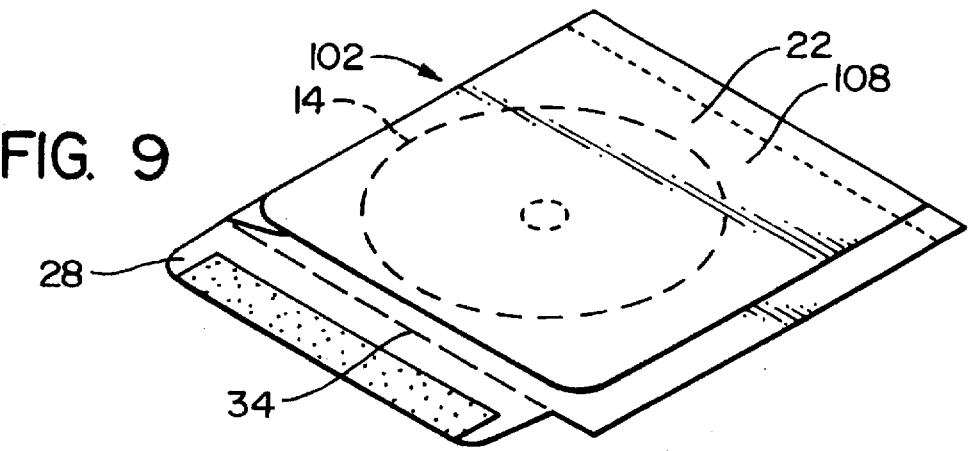

Then the disc 14 is moved through the expanded opening 110 and into the pocket 108 defined by a pocket section 106. After this, the air stream is temporarily shut off. The sleeve 102 is shown in FIG. 9 with the disc 14 having been moved completely into the pocket 108. Then the sleeve 102 with the disc 14 is moved to a sealing station. Here the closure and access flap 28 is folded over about the fold line 34 so that the flap 28 is bonded to the upper surface of the cover ply section 22.

Figure 10:
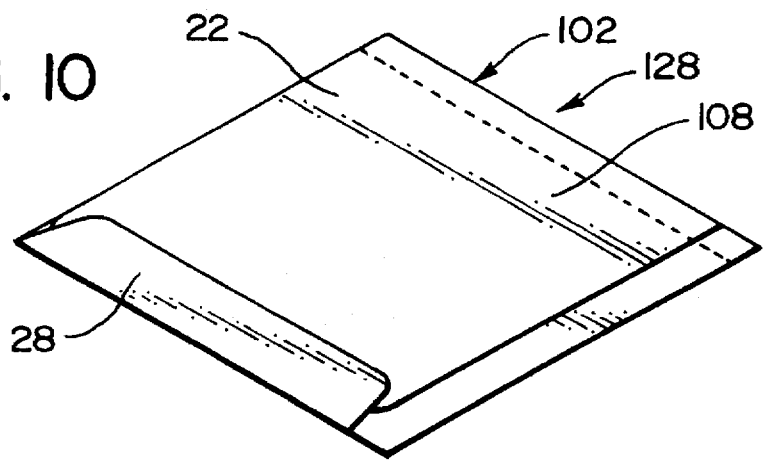

In the configuration of FIG. 10, the sleeve 102 entirely encloses the pocket 108 so that the disc 14 is securely retained within the sleeve 102. The sleeve 102 with the disc 14 is now arranged and configured to go through the binding process to form the finished product as shown in FIGS. 1 and 2.

In FIGS. 9 and 10, there is shown a round CD disc being inserted into the sleeve 102. In the event that a floppy disc 14 is being inserted, the same steps are followed as described above.

The completed sleeve 102 and the disc 14 contained therein, as illustrated in FIG. 10, will for the remaining text of this application be referred to as the sleeve/disc package 128.

With reference to FIG. 11, there is shown schematically an apparatus 130 (shown in plan view in FIG. 11) which can be used to accomplish the process described immediately above. This apparatus comprises a conveyor 132 having a continuously moving conveyor belt 134, having a plurality of suction openings 136 along its length. There is a sleeve dispensing apparatus 138 in which is stacked a plurality of sleeves 102. The sleeves 102 are dispensed from the bottom of the apparatus 138 in the proper timed relationship relative to a disc feeder 140.

The disc feeder 140 has a rotatable circular support plate 142 on which are five stacks 144 of discs 14. The plate 142 rotates to move a full stack 144 into a feed location 146 when the stack 144 at the feed location 146 has the last disc 14 removed therefrom. There is a moveable stop arm 148 which properly locates the stack 144 at the feed station 146.

Figure 8:
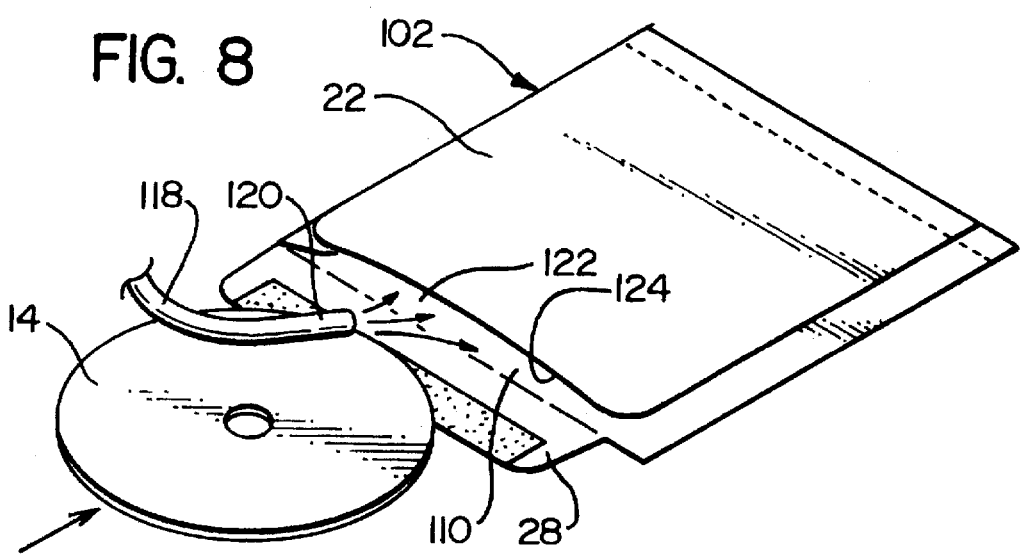
FIG. 8, 9 and 10 are three isometric views which illustrate in sequence the manner in which a disc is moved into the pocket of the sleeve and the sleeve is sealed.

To move each disc sequentially from the feed station 144, there is provided an arm 150 pivotally mounted to a post 152, this arm 150 having at its swing end a suction cup 154. In operation, the arm 150 is moved with its suction cup end 154 over the discs 14 at the feed station 146. The arm 150 is lowered, with the suction cup 154 engaging the disc 14, after which suction is applied. The arm 150 is lifted, rotated, and then lowered so that the disc 14 is located a short distance away from the end opening 110 of the sleeve 102 to be over the flap 128. Just prior to moving the disc 14 into the sleeve 102 which is at its loading location, indicated at 156, the pressurized air tube 118 has a stream of air discharged therefrom to open the sleeve opening 110, as indicated in FIG. 8. Then the arm 150 rotates a short distance further so that the edge of the disc 14 moves underneath the outer edge 124 of the upper ply 20 of the sleeve 102. The suction at the suction end 154 is released, and the arm 150 is moved back to its original position to engage the next disc 14.

The conveyor belt 134 is then moved by the conveyor system to a following station 158 where there is a push mechanism 160 which moves the disc 14 further into the sleeve 102. Then there is a following station 162 where there is a second push member 164 that moves the disc 14 completely into the sleeve 102.

Then the belt moves the sleeve 102 with the disc 14 contained therein to a final folding station, where the closure flap 28 is folded about its fold line 34 and pressed into sealing relationship with the adjacent surface portion of the over ply 22. This completes the formation of the sleeve/disc combination 128 as shown in FIG. 10.

A commercial machine adapted to accomplish the task of inserting the disc in the sleeve (possibly with adaptations) is one called the "CD ROM SLEEVE INSERTER" produced by the Everhard Company of Lexington, Ky.

d) Manufacturing the Book/Sleeve/Disc Combination 10

This process is illustrated in FIGS. 12 through 26. It should be noted that this entire process which follows (as shown in FIGS. 12 through 26) an be substantially accomplished in a totally automated fashion utilizing presently existing machinery. For example, a Mueller Martini Star Binder would be suitable.

The several steps in this final process of forming the finished product will now be presented under separate heading.

d-1) The Gathering Process

With reference to FIG. 12, there is shown somewhat schematically in side elevational view a gathering line 176 which can be used in the present invention. This gathering line comprises a plurality of pocket assemblies 178, a lower conveying section 180, and an intermediate transfer section 182 by which groups of book pages (called "signatures") 184 and the sleeve disc package 128 are transferred onto the conveying section 180 in a manner to form the book blocks.

As a preliminary comment, it is common to provide the signatures 184 as follows. First, as an example, the printing for 32 pages of a book are imprinted on a larger sheet of paper having an area somewhat larger than the total area of the sixteen sheets of the end pages, and with the printing for each page being spaced moderately from one another. Each such sheet of paper is folded over on itself four times to make sixteen layers of paper stacked on top of each other, with each layer being a moderately oversized sheet having printing on both sides, and with the printing on the sheets being in numerical order as these are printed in the book. The sheet is perforated along the fold lines.

Each set of signatures 184 is placed in a related one of the pocket assemblies 178. Each pocket assembly 178 is in the form of a bin or container, having side walls 186 and a floor 188 which is at least partially open at its front discharge end to permit access to the lowermost signature 184. In FIG. 12, the pocket assemblies 178 are shown rather schematically and the forward side facing outwardly from the drawing is shown as an open side. The signatures 184 are placed in a stack in each of the pockets 189 formed by the pocket of the pocket assembly 178.

The conveying section 18 comprises a conveyor belt 190 having an upper run 192 and belt engaging rollers, one of which is shown at 194. The conveying belt 190 is provided with a plurality of moving collecting stations 196 located at longitudinally spaced locations along the belt 190. Each collecting station 196 is defined by an upstanding push rod 198.

There is provided an elongate slideway 200 comprising an elongate slanted support platform 201 and an upwardly directed and moderately slanted elongate side wall 202 extending out from the lower edge 204 of the platform 201. This slideway 200 extends along the full length of the gathering line 176, and the push rods 198 extend through a slot 205 in the platform 201.

The transfer section 182 comprises a plurality of transfer units 206, each of which comprises a pair of spaced transfer drums 208 and a pair of transfer arms 210. Each pair of transfer arms 210 is mounted about a pivot location 212, and at the outer end of each arm 210 is a suction cup 214. Also, there is at a peripheral location on each drum 208 a clamping finger 216.

FIGS. 13A through 13C illustrate the manner in which the signatures 184 moved from its related pocket 189 and deposited on the slideway 200 at stations along the conveying belt 172. The manner in which the sleeve disc package 128 is deposited on the stack of signatures 184 is in large part the same as that in which the individual signature 184 are placed at each transfer station 186. However, there are some differences in the manner the sleeve disc package 128 is transferred and this will be described later.

To describe the operation of one of the transfer units 206, initially, as shown in FIG. 13A, the pair of transfer arms 210 are moved so that their two suction cups 214 engage the lower left hand bottom surface portion of the lowermost signature 184. Then the pair of arms 210 are rotated downwardly to position the left end 218 of the signature 184 adjacent to the upper surface of the pair of drums 208. The clamping fingers 216 move downwardly to grip the left end of the signature 184, as shown in FIG. 13B.

Then, as shown by the arrow in FIG. 13B, the two drums are rotated approximately 180° to carry the signature 184 downwardly onto the related collecting station 196. The clamping fingers 216 are released, and the signature 184 drops into place onto its related stack of signatures 184 or (in the case of the first signature 184) directly onto the platform 201. Each pocket assembly 178 and its related transfer unit 286 comprise a stationary transfer station 213.

In operation, the upper run 192 of the conveyor belt 190 moves in the direction indicated by the arrow 218. As each push rod 198 is moving closely toward each stationary transfer station 217, the related transfer unit 206 moves one of its related signatures 184 downwardly onto the slideway portion located directly below, in the manner shown in FIGS. 13A through 13C. Then as each rod 198 on the conveyor belt 190 continues to move from one transfer station 217 to the next location, another signature 184 is moved by the related transfer unit 206 onto the moving collecting station 196 to be engaged by the push rod 198.

In FIG. 12, there is shown a gathering line where there is a total of ten pocket assemblies 178. Nine of these are pocket assemblies 178 contain conventional signatures 184. The pocket assembly 178 positioned the furthermost left contains the sleeve/disc packages 128. Thus, as each of the signatures 184 is deposited sequentially onto the slideway 200 to form the stack of signatures 184, the book block that is being formed is essentially complete at the ninth transfer station 217. When the book block reaches the last transfer station 217 at which the sleeve/disc packages 128 are located, each sleeve/disc package 128 is deposited onto the stack of signatures 184.

The manner in which the sleeve/disc packages 128 are deposited onto the conveyor belt is shown in FIGS. 14 through 17. As indicated previously, this is rather similar to the manner in which the signatures 184 are deposited onto the slideway 200. In the following description related to FIGS. 14 through 17, the components which are the same as the corresponding components at the other transfer stations 217 will first be described, and then the differences in the transfer station 217 showning FIGS. 14 through 17 will be indicated. The transfer unit 206 shown in FIGS. 14 through 17 comprises the pair aforementioned rotating drums 208, and a pair of transfer arms 210 with the pivot location 212 and each with the end suction cup 214. Also, there is the pocket assembly 178.

This pocket assembly 178 is shown somewhat schematically in FIGS. 12 and 13A through C. In the actual machine which has been adapted for use on the present invention, in each of the pocket assemblies 178, the side walls 186 are formed as part of vertically aligned "L" shaped brackets 220, with one leg of the "L" being a sidewall 186, and a forward wall portion 222 being the other leg. Thus, the side wall portions 186 engage only the forward portions of the sleeve/disc package 128, and the forward wall portions 222 engage only the outside portion of the front side edges of the signatures 184 or packages 128. There is a rear wall 224 and the aformentioned bottom wall 188.

There is a pair of downwardly extending stationary front arms 226 having at their lower ends small tan members 228 that extend horizontally into the pocket a short distance. Also, there are two adjustable set screws 230 which are threaded into the pocket area a short distance. The function of these two tabs 228 and the adjustable positioning set screws 230 are to temporarily prevent the bottommost signature 184 or sleeve/disc package 128 from dropping before the next cycle at which that lowermost signature 184 or sleeve/disc package 128 is to be removed.

There is a center hold and release arm 232 which is pivotally mounted at 234. This arm 232 has a right angle extension 236 which retains the lowermost signature 184 or sleeve/disc package 128 within the pocket 186.

Also, there is a pivotally mounted spring arm 238 for each transfer drum 208, having a retainer roller 240 at its swing end, and a pivotally mounted end 242. The spring arms 238 are urged by tension springs 244 to come into engagement with the perimeter of the transfer drum 208.

Figure 14:
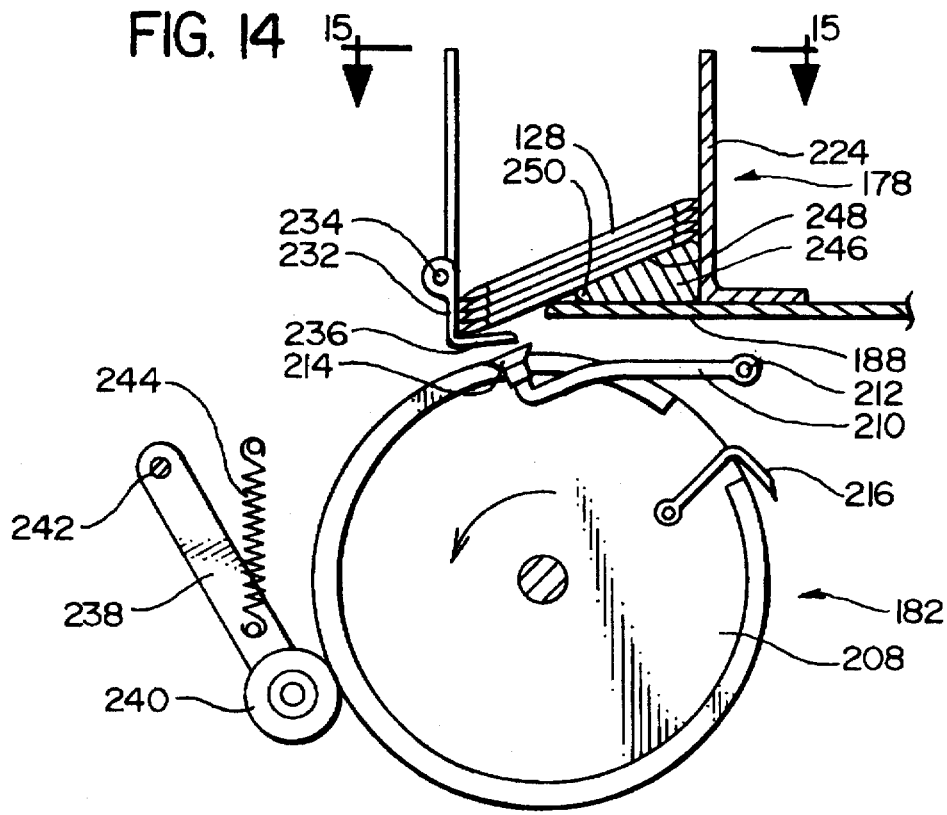
FIG. 14 is a transverse sectional view taken along line 14—14, showing the gathering line station for the disc/sleeve packages beginning a single cycle of depositing a disc/sleeve package onto the conveyor of the gathering line.
Figure 15:
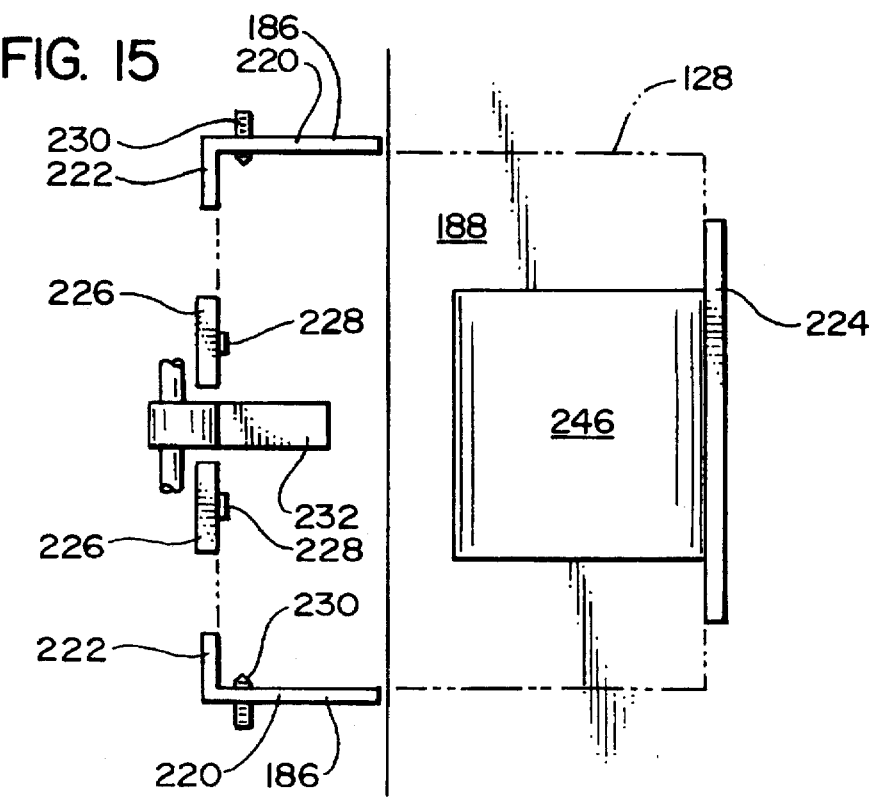
FIG. 15 is a top plan view of the pocket assembly of the gathering station for the disc sleeve packages, showing the disc sleeve packages in broken lines.

The components described above are present in each of the ten transfer stations 217 shown in FIGS. 2-12. However, for the transfer station 217 which contains the sleeve/disc packages 128, there is a modification made in the pocket assembly 178. More specifically, there is provided a wedge support member 246 having an upper moderately slanted surface 248 that extends downwardly to a forward edge 250 of the lower wall 188. Thus, as can be seen in FIG. 14, the sleeve/disc packages 128 extend downwardly and forwardly at an angle of about 30°. Also, the "L" shaped wall members 220, and the bars 226 are positioned somewhat lower so that the tips of the set screws 230 and the tabs 228 are positioned in supporting engagement with the front edge of the lowermost sleeve/disc package 128. Likewise, the lower finger member 236 of the arm 232 is at a lower supporting position in engagement with the lower front edge of the lowermost sleeve/disc package 128, and the vertical arm member 232 is in engagement with the several lower sleeve/disc packages 128.

This is a modification of the transfer station apparatus as it exists in a commercially available machine. In the commercial machine, the wedge member 246 is not present, and the signatures 184 lay flat against the bottom wall 188. Also, the "L" shaped wall members 230, the bars 226 and the retaining arm 232 are positioned higher so that these engage the lowermost signature 184 which is aligned horizontally on the bottom wall 188. The reason for this modification will be better recognized by perusing the next several paragraph where the operation of this transfer station 217 for the sleeve/disc package is described.

In FIG. 14, there is shown the transfer station apparatus at its initial position. The two drums 208 are rotated to a position slightly forward of the forward edges of the sleeve/disc package 128, and the clamping fingers 216 are positioned at a more forward location. The transfer arms 230 reach upwardly to cause the suction cups 214 to come into engagement with the lower forward surface of the lowermost sleeve/disc package 128, and at that time the retaining arm 232 is retracted to the position shown in FIG. 16.

The suction is applied in the cups 214, the arms 210 are rotated downwardly to pull the lowermost sleeve/disc package 128 downwardly, and the clamps 216 are moved rearwardly to grasp the forward edge of the lowermost sleeve/disc package 128 and hold it against the surfaces of the drums 208. The tips of the screws 230 and the tabs 228 engage the forward portion of the sleeve/disc package 128 which is immediately above is dropping down to the next lower level.

Figure 16:
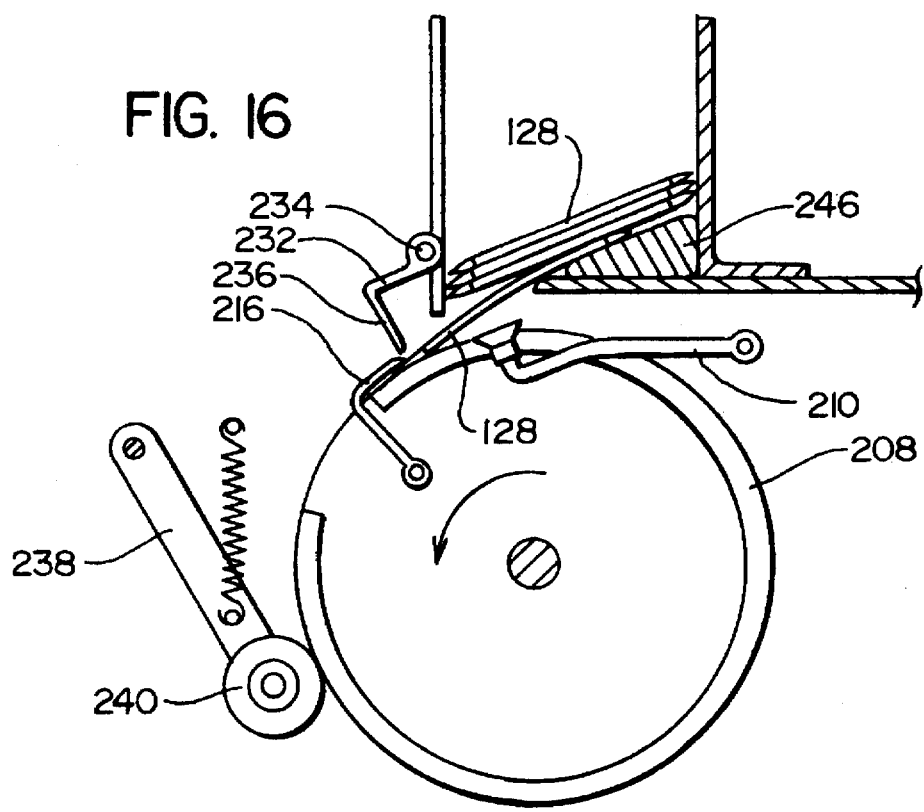
FIG. 16 is a view similar to FIG. 15, showing the lowermost disc/sleeve package being initially withdrawn from the pocket.

In FIG. 16, the drums 208 have rotated a short distance after gripping the front end of the sleeve/disc package 128, so that the package 128 has moved a short distance down the slopped surface 248. The disc 14 in the package 128 is sufficiently flexible so that it can bend a certain amount, and the angle of the slope surface 248 is selected so that the sleeve/disc package 128 does not rotate about the front edge 250 of the lower wall 188 as a fulcrum so as to be exerting a force to lift all of the packages 128 upwardly in the pocket.

Figure 17:
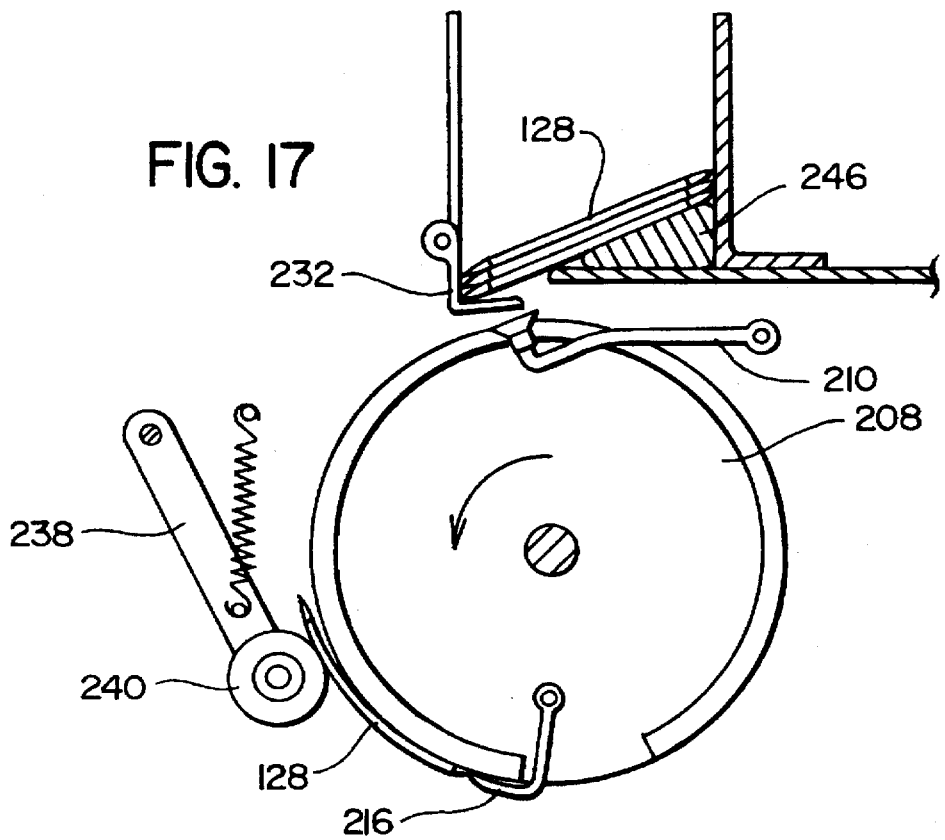
FIG. 17 is a view similar FIGS. 15 and 16, showing the disc/sleeve package being in a position to be deposited onto the conveyor.
Figure 20:
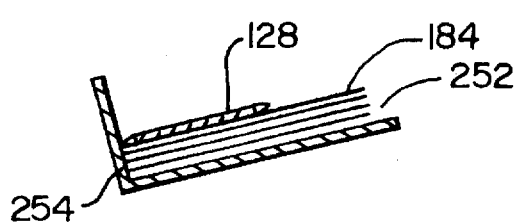
FIG. 20 is a cross sectional view taken at line 20—20 of FIG. 19A.

As the drums 208 continue their rotation in the position of FIG. 17, the sleeve/disc package 128 moves by the roller 240, to the lower location as shown in FIG. 13C, where the clamping fingers 216 release the sleeve/disc package 128.

FIG. 18 is a top plan view illustrating the total book block 252 which is to proceed through the remainder of the processing line. Each book block 252 comprises a vertical stack of signatures 184, on top of which is the sleeve/disc package 128 as shown in FIG. 10. It will be noted that the binding edge 98 of the edge portion 112 is adjacent to the side wall 202 of the conveying section 180. Also, the trimmable foot portion 114 of the sleeve/disc package 128 is positioned adjacent to the positioning rod 198. This assembled book block 252 (making up the stack of signatures 184 and the single sleeve/disc package 128) is now ready to go through the next step.

d-2) The Application of Glue to the Book Block 252

Reference is now made to FIGS. 19A-19G, which show somewhat schematically the book block 252 moving along a conveying system from right to left. The spine portion 254 of the book block 252 is located adjacent to the slanted sidewall 202 of the slideway 200. As shown in the three right hand sequential illustrations of FIG. 19A-C, the book block 252 is moved from location of FIG. 19A to FIG. 19C where the book block is rotated about 70° so that the spine 254 is located downwardly.

Figure 21:
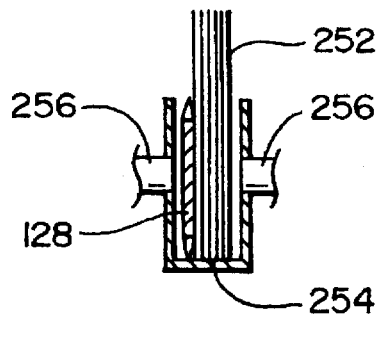
FIG. 21 is a view taken along line 21—21 of FIG. 19C.
Figure 22:
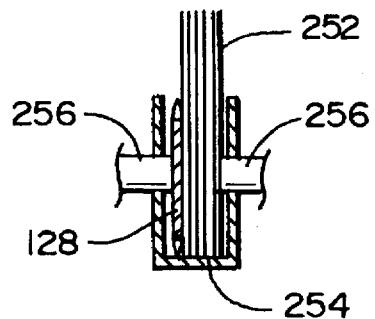
FIG. 22 is a cross sectional view taken along line 22—22 of FIG. 19D.

When the book block 252 has reached the location at 19C, the lower side portion of the book block 252 is positioned between two jaws or bars 256 which are moved from the position of FIG. 21 to that of FIG. 22 to hold the book block (including the signatures 184 and the sleeve/disc package 75) firmly in place.

The book block 252 continues to the location indicated at 19E, where a grinding wheel 258 having teeth 260 on its perimeter engages the edge portions at the spine 254 of the book block 252 (including the exposed edge of the binding edge portion 112 of the sleeve/disc package) to roughen the edge portions. This is done in a conventional perfect or case binding process to make the edge portions of the sheets in the book block better accept the glue that is applied.

The book block 252 now moves to the next location where there is an application of glue, this being shown somewhat schematically. There is a lower container with a supply of glue 262, and an applicator wheel 264 which rotates its perimeter carrying surface into the glue 128 and brings a layer of glue upwardly to be applied to the roughened surface 266 at the spine of the book block 252.

After this, the book block 120 proceeds to the next processing location.

d-3) Applying the Cover to the Book Block 252

Figure 23A:
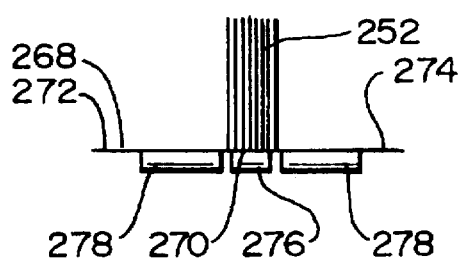
FIGS. 23A through 23C are views taken from the vantage point shown at line 23A-23A of FIG. 19G, showing the manner in which the cover is applied to the book block.
Figure 23B:
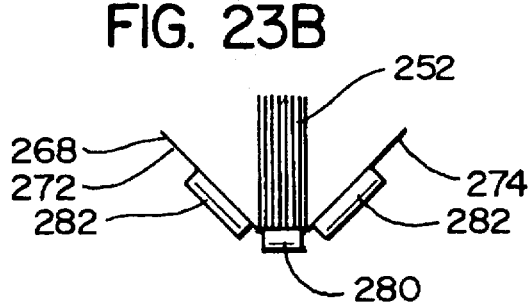
Figure 23C:
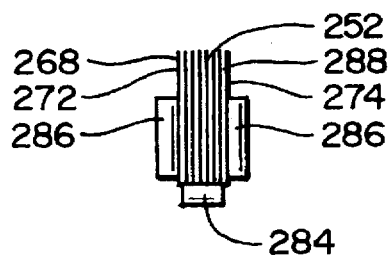

FIGS. 23A through 23C illustrate the manner in which, in the perfect bonding process, a cover 268 is applied to the book block 252. The cover 268 comprises a central spine 270 having a width dimension matching the width dimension of the book block 252, and front and rear panel portions 272 and 274, respectively.

Initially, as shown in FIG. 23A, the book block 252 is positioned so that its roughened spine surface 266 with the glue applied thereto faces the spine 270, and the cover 268 is elevated to make contact with the book block 252. Then as the book block 252 and the cover 268 move further along in the processing lines, the bottom surfaces of the panels 272 and 274 are engaged to move these upwardly to be pressed against the front and rear surfaces of the book block 252. Since the components of the machinery which accomplish this operation are well known in the prior art, these are not shown in FIGS. 23A through 23C, and these will not be described in any detail in this text.

If the binding for the book is a lay open book where a piece of fabric is bonded to the spine of the book block, then the fabric is intended to be considered as part of the spine of the book cover, and the claims of this patent application are to be interpreted to include this type of binding, as well as other variations in the binding and/or book cover.

The sequence shown in FIGS. 23A, 23B and 23C is illustrated somewhat schematically at three different stages of the operation. In FIG. 23A, there are shown schematically middle and side rollers 276 and 278, respectively. In FIG. 23B, there is shown a second set of rollers 280 and 282 which have begun to move the panels 272 and 274 upwardly. At FIG. 23C a further downstream set of rollers 284 and 286 have pushed the book block 252 and the cover 268 further along so that the panels 272 and 274 are flush against the front and rear surfaces of the book block 252. This forms the book which is nearly completed, but which yet needs to be trimmed.

This pretrimmed book 288 is illustrated in plan view (looking at the front cover of the book) in FIGS. 24A, B and C, and it has a spine 290, an outer edge 292, a top edge 294 and a bottom edge 296. There is shown in phantom lines the outline of the sleeve/disc package 128 bound into the book 288. The spine 290 is in its completed form and is not subject to further processing. However, the remaining three edge portions 292, 294 and 296 and require a finished trimming operation to form smooth edge surfaces, the trim lines being shown as broken lines. This is accomplished by machinery which is already in existence, and is part of the overall processing line described thus far with reference to FIGS. 12 through 23.

To describe the trimming operation, reference is made to FIGS. 24A, B and C. The pretrimmed book 288 is moved to a cutting station, shown schematically in FIGS. 24A, B and C. At this station first a plate 298 is pressed downwardly on top of the book 288. Then a knife blade descends downwardly to trim the book at the outside edge 292, as shown in FIG. 24B, and the trimmed edge is illustrated at 299. In FIG. 24B, the top and bottom edge portions of the book 288 are trimmed at lines 300 and 302, and this produces the finished book.

To illustrate another feature of the present invention, reference is made to FIGS. 25 and 26. The pretrimmed book is illustrated at 288 positioned on a cutting table 302. Two side cutting blades are shown at 306 and 308. It can be seen that the sleeve/disc package 128 is at the lower position cover of the pretrimmed book 288. There is provided on the cutting base 304 an "L" shaped filler plate or member 310 having a thickness of substantially the same as that of the sleeve/disc package 128. It has been found that this alleviates a tendency for the knives 306 and 308 to engage the book 288 and cause the portion of the spine 290 that is not immediately adjacent to the sleeve/disc package 128 to become misaligned along the spine at the location of the edge extending beyond what is termed the upper edge 302 of the sleeve/disc package 128. As can be seen in FIG. 26, when the clamp 314 is pressed on top of the pretrimmed book 288, and when the knife edges 306 and 308 come down, the spine portion 290 is uniformly supported. This has been found to be particularly important when the computer disc is a "floppy" disc with a greater thickness dimension.

Figure 27:
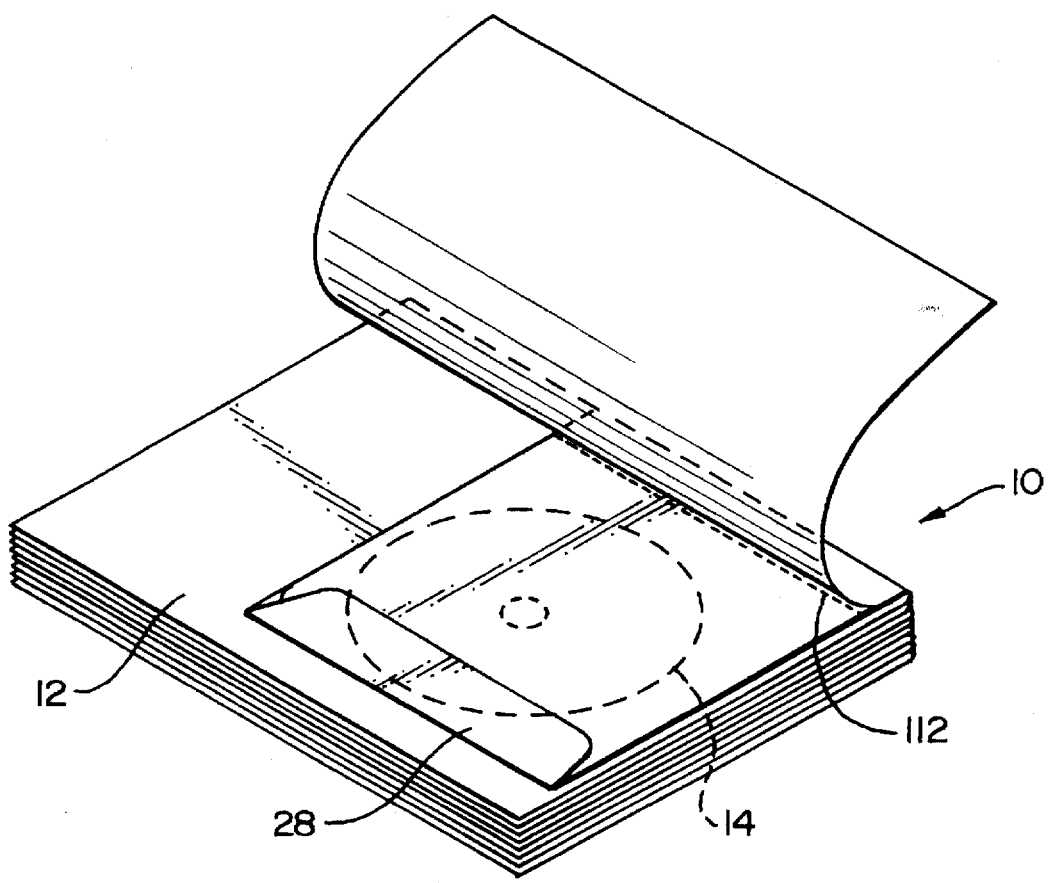
FIG. 27 is an isometric view illustrating the finished book/sleeve/disc combination, with the back cover of the book lifted for purposes of illustration.

With the trimming operation complete, there is the finished product 10 of the present invention, shown in FIG. 27, with the back cover being raised. There is the sleeve/disc combination 328 connected into the binding of the book, with the binding edge portion 112 connecting to the spine of the book 12. The closure and access flap 28 is positioned adjacent to the outer edge portion of the book 12.

e) Modified Version of the Envelope Used in the Present Invention

Figure 28:
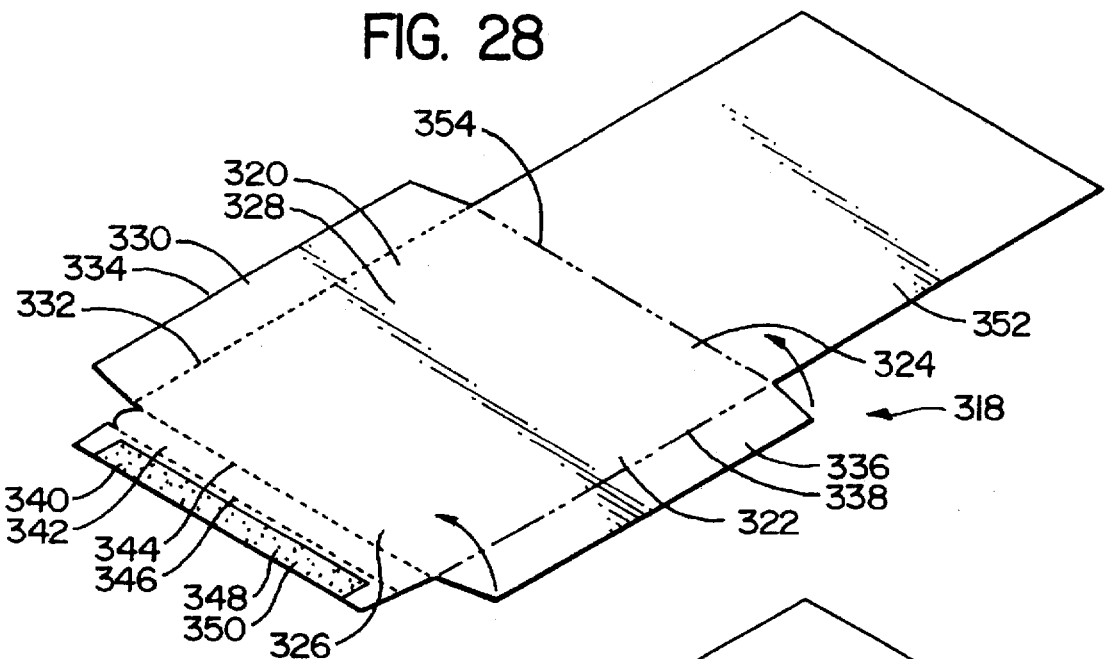
FIGS. 28, 29 and 30 are isometric views similar to FIGS. 3, 4 and 5 showing a sequence of forming a modified form of the sleeve.
Figure 29:
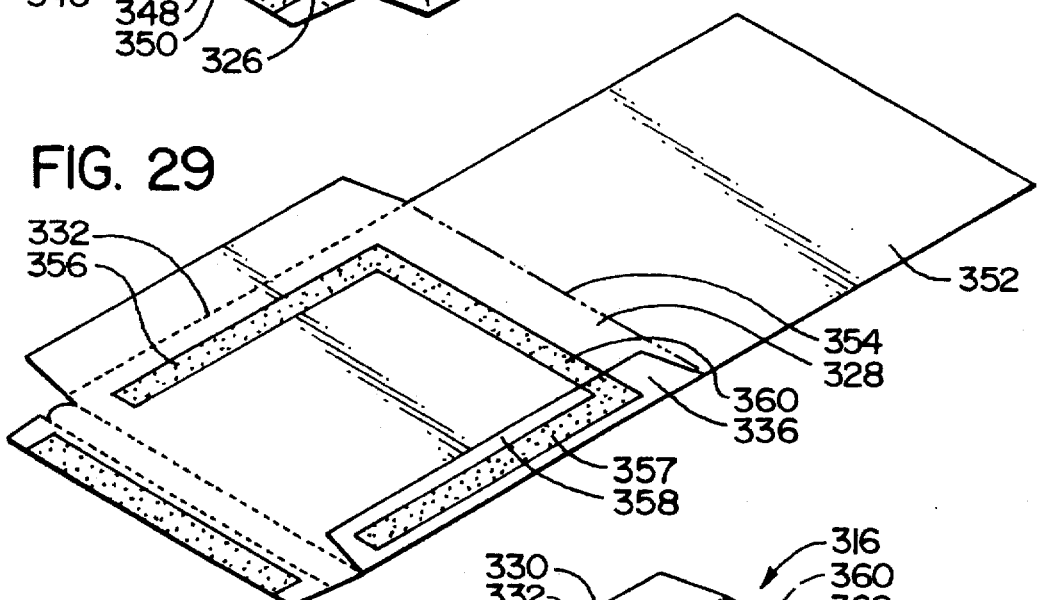

A method of making another type of sleeve usable in the present invention will now be described with reference to FIGS. 28 through 30. In FIG. 28, there is shown a preformed blank 318 made from conventional paper stock.

In describing this blank 318 and the subsequent steps by which it is formed into the finished sleeve 316, the terminology used to identify portions of the blank 318 will correspond to where these portions are located when placed into the book 12. Accordingly, the blank 318 has an inner portion 320 which will at the end of the manufacturing operation be near the back or spine of the book 12. There is an opposite outer portion 322 which in the end configuration of the book will be nearer to the outer loose edges of the pages of the book 12. There is a bottom portion 324 which in the end configuration of the book will be along the lower edge of the book 12. Finally, there is an upper portion 326 which in the end product will be positioned closer to the top edge of the book extending from the spine toward the outer free edge of the book 12.

The blank 318 comprises a rectangular base ply section 328. At the inner edge portion 320, the inner edge of the base section 328 connects to a binding flap 330 along a tear line 332. The free edge 334 of the binding flap 330 becomes positioned in the end product adjacent to the spine of the book and is glued into the spine section. The tear line 332 is formed by perforations so that the main portion of the sleeve can easily be torn free from the book 12.

At the outer portion 322, the base section 328 joins to an outer flap 336 along a fold line 338. The function of this outer flap 336 is essentially to be folded over to form a closed outer edge for the sleeve.

At the upper portion 326 of the blank 318, there is a closure and access flap 340 which in this particular embodiment is formed in two portions. First, there is a tear strip 342 which connects directly to the base section 328 along a first tear line 344 (which is simply a line which has spaced perforations to permit the tear action. Then there is a second lengthwise extending tear line 346 which extends along the lengthwise dimension of the flap 340 along approximately a lengthwise center location on the flap 340. As will be disclosed hereinafter, these two tear lines 344 and 346 enable the tear strip portion 342 to be easily removed to provide an opening through which the disc 14 can be easily removed from the sleeve 316 and also be placed back onto the sleeve 316.

The closure and access flap 340 comprises a second flap portion 348 which has on its surface a layer of adhesive 350. This second flap portion 348 joins to the tear strip portion 342 along the second tear strip line 346.

At the bottom portion 324, there is a cover ply section 352 which joins to the base ply section 328 along a lower fold line 354. In this particular configuration, the cover ply section 352 has the same shape and size as the base ply section 328.

As with blank shown in FIGS. 3–5, the blank 318 can be manufactured by machinery which already exist in the prior art, with some modification or adaptation. The basic blank 318 can have its outside edges cut from paper stock by conventional means. Then the three tear lines 332, 344 and 346 can be made by perforating the paper at spaced intervals along those lines. The adhesive layer 350 is preapplied to the blank 318, and this can be done by making an adaptation to existing machinery to add the step of applying such adhesive layer 350.

The first step in forming the sleeve is (as indicated by the arrows in FIG. 26) to fold the outer flap 336 along its foldline 338 to a position where it overlies the adjacent upper surface portion of the base section 328. After that, as shown in FIG. 29, a glue layer is applied in a U shaped pattern where there are three strips of glue, namely an inner glue strip 356 which is applied to the upper surface of the base section 328 a short distance from the tear line 332, an outer glue strip 357 which is applied to the upper exposed surface of the outer flap 358, and a bottom glue strip 360 which is applied over the upper surface of the base section 328 and extending also over part of the outer flap 336 to join to the bottom end of the outer glue strip 358.

This bottom glue strip 360 is spaced from the fold line 354 of the cover ply portion by a distance which is sufficient to provide what is called a "trimmable foot". As disclosed previously, in the actual book making operation, this edge (along with the adjacent portions of pages of the book) is trimmed off after the book is formed. By providing this trimmable foot and spacing the glue line 360 upwardly relative to the fold line 354 the bottom portion of the book can be trimmed away while still leaving the bonded bottom portion of the sleeve 316 intact to properly contain the disc 14.

Figure 30:
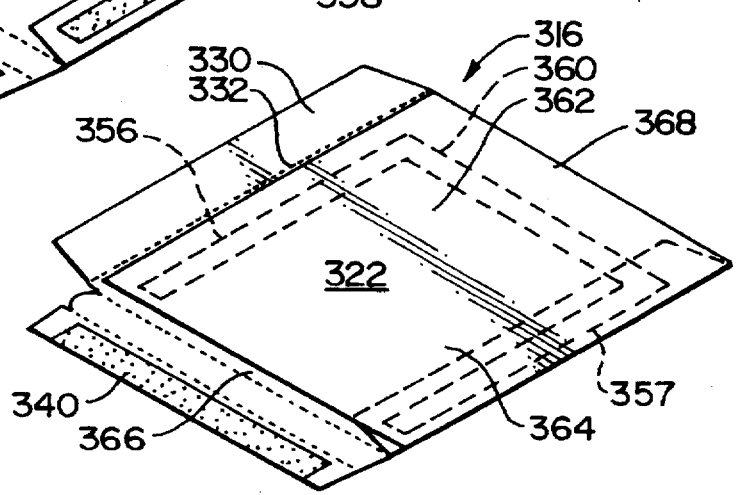

The next step is, as shown in FIG. 30, to fold the cover ply portion 352 about its fold line 354 to position it against the upper surface of the base play 328 so that the cover ply section 352 becomes bonded to the base ply section 328 along the glue lines 356, 357 and 360. With this being accomplished, the sleeve 316 is in the configuration as shown in FIG. 30. In the configuration, as shown in FIG. 30, the sleeve 316 can be considered as comprising four functional components. First, there is a pocket section 362 which defines a pocket 364 having an open top end position at 366, and enclosed along three sides at the bonding strips coinciding with the glue strips 356, 358 and 360. Next, there is the binding flap 330 which remains extending from the pocket section 362. Then there is the closure and access flap 340 which remains in its open position extending from the base ply section 328, as shown in FIG. 26. Finally, there is the trimmable foot portion 368 which is that portion of the sleeve 316 that extends approximately from the bottom glue line 360 to the location of the fold line 35 which is now at the bottom of the sleeve 316.

Figure 31:
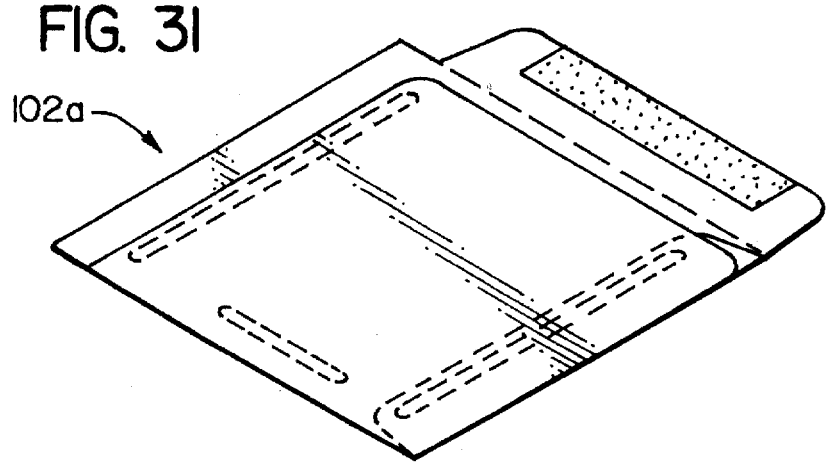
FIG. 31 is an isometric view similar to FIGS. 8 and 30 showing a modified version of the sleeve utilized in the present invention.

FIG. 31 shows a slightly modified configuration of the finished sleeve 102 shown in FIG. 5. The sleeve of FIG. 31 is designated 102a, and it is substantially the same as the sleeve 102 of FIG. 5, except that the tear line 100 has been eliminated. Thus, the sleeve 102a remains permanently bound into the book, this being done so that the computer disc 14 can later be stored into the sleeve 102a of the book 12.

Figure 32A:
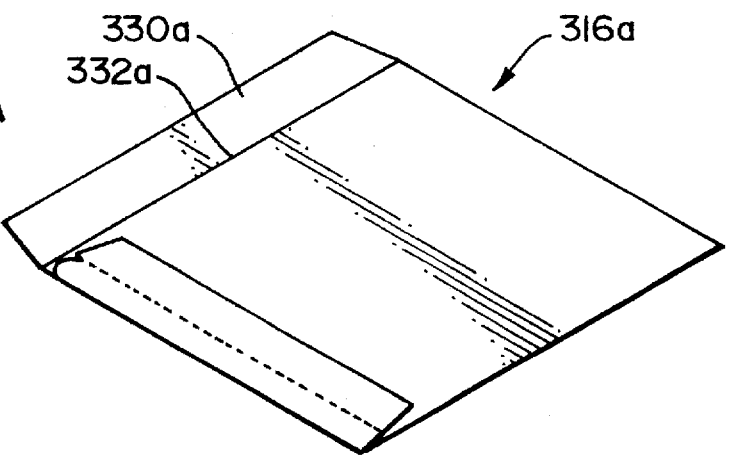
FIG. 32A and 32B are views similar to FIG. 31 showing two further modifications of the sleeve incorporated in the present invention.

FIG. 32A shows a further modified version of the sleeve. This sleeve, designated 316a, is substantially the same as the sleeve 316 as shown in FIG. 30, except that the binding flap 330a is connected by a fold line 332a, instead of the tear line 322 of the sleeve 316 shown in FIG. 30.

Figure 32B:
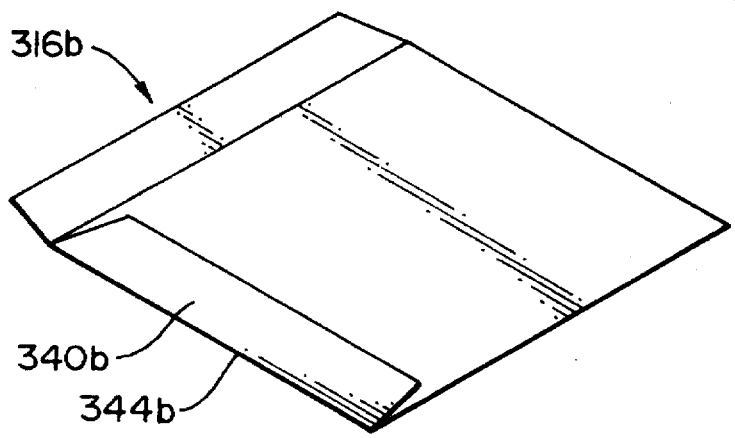

FIG. 32B shows a further modification of the sleeve 316 shown in FIG. 30. This sleeve 316b of FIG. 32B is substantially the same as in the sleeve 316a shown in FIG. 32A, except that the closure flap 340b is not formed with the two tear lines 344 and 346 shown in FIG. 28. Rather, the flap 340 is joined by a fold line 344b to the sleeve 316b.

Figure 33:
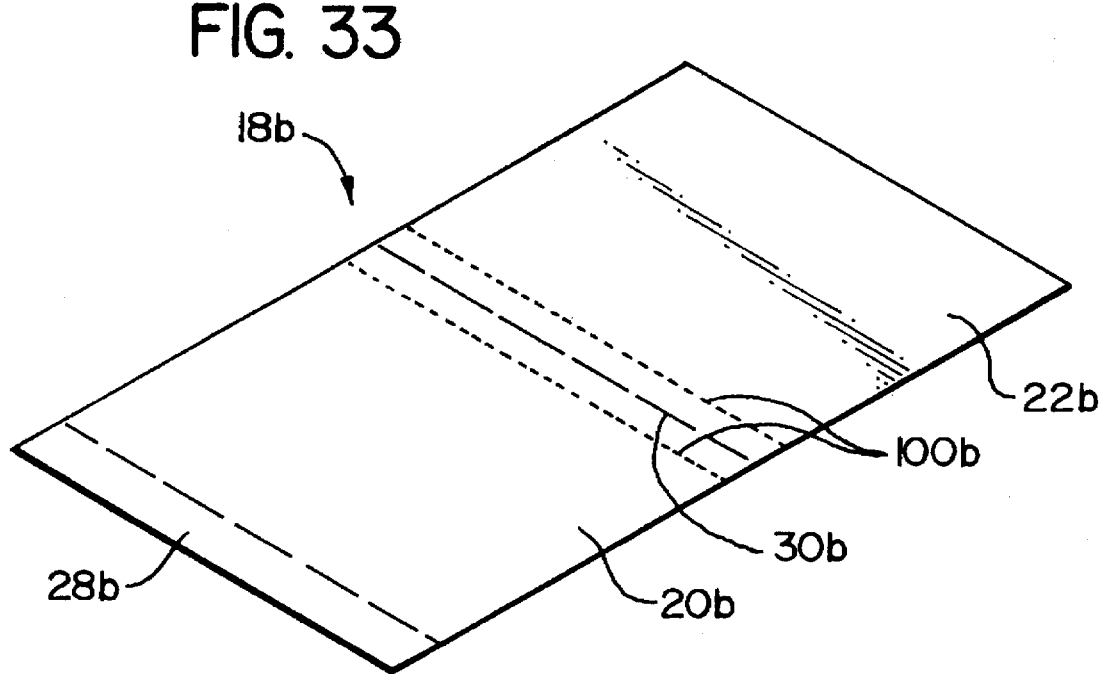
FIG. 33 is an isometric view showing a book blank for making yet another type of sleeve adapted for use in the present invention.
Figure 34:
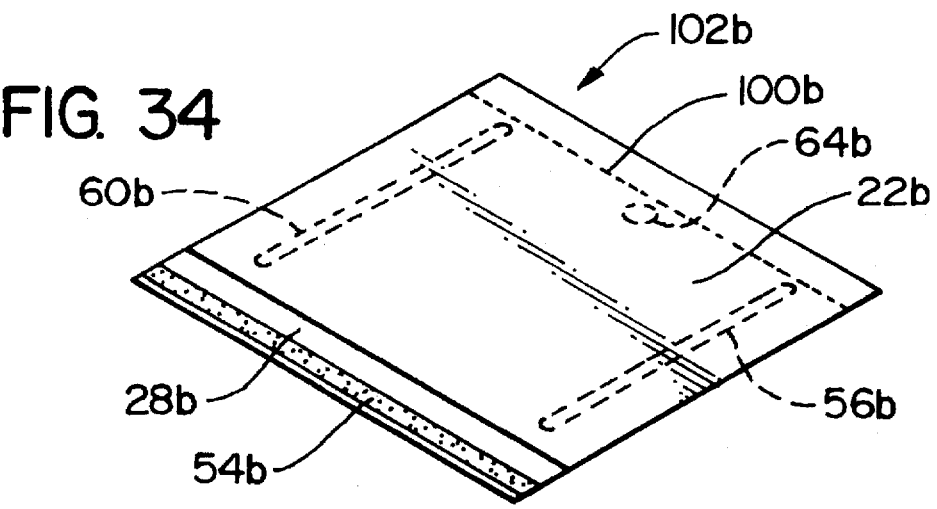
FIG. 34 is an isometric view showing the blank of FIG. 33 having had adhesive applied thereto and folded over into its completed configuration, with the flap open to receive a computer disc therein.

FIG. 33 and 34 show a further modified version of the sleeve 102 of FIG. 5. In FIG. 33, there is shown a blank 18b having a base ply 20b and a cover ply 22b, joined along a fold line 30b. The two plys 20b and 22b each have a tear line 100b a short distance away from the fold line 30b.

The two longitudinal glue strips are applied at 56b and 60b, and a single spot of glue is applied at 64b. Then the cover ply 22b is folded over onto the base ply 20b.

The base ply 20b has a closure flap 28b with a pressure sensitive or moisture sensitive glue strip 54b. The finished sleeve 102b is shown in FIG. 34, and this sleeve 102b then has the disc 14 inserted into the sleeve 102b in the manner described previously herein.

II. SECOND MAIN EMBODIMENT-STITCH BINDING PROCESS

Figure 35:
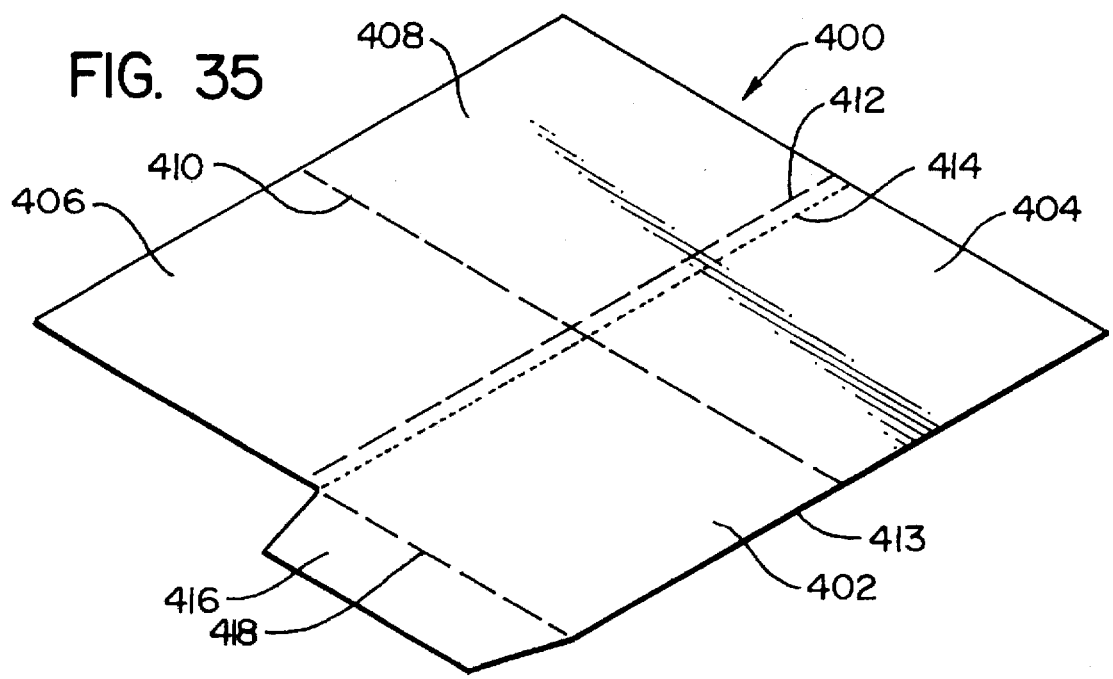
FIG. 35 is an isometric view showing a blank positioned to have adhesive applied thereto and be formed into a completed sleeve which is adapted for use in the second main embodiment of the method of the present invention where the present invention is used in a stitch binding.
Figure 36:
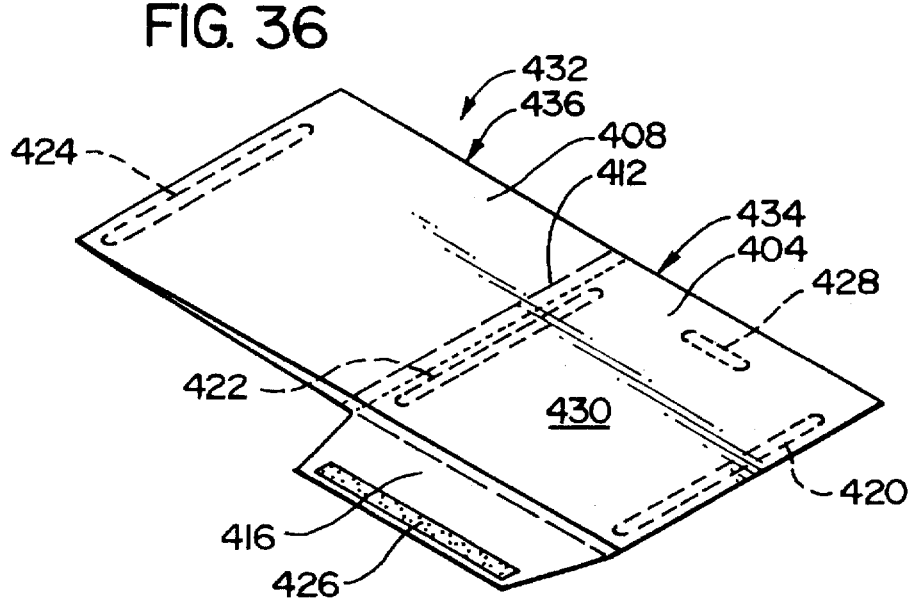
FIG. 36 is an isometric view showing the blank of FIG. 35 having adhesive applied thereto and being folded in a form to have the disc inserted therein and be incorporated in the gathering line to form the completed book or magazine having a stitch binding.

Reference is made to FIGS. 35 and 36, which show the process of making the sleeve for this second embodiment, and also the configuration of the sleeve itself prior to inserting the disc 14 therein.

There is provided a blank 400 having a generally rectangular configuration. The blank 400 has a base ply 402, a cover ply 404, and two counter balancing plys 406 and 408. As will be described later herein, the two plys 406 and 408 simply serve what might be termed a "counter balancing" function during the stitch binding process. There is a transverse fold line 410 extending entirely across the width of the blank 400, this fold line 410 separating the two ply sections 406 and 408 from one another and also separating the ply sections 402 and 404 from one another.

There is also a longitudinally extending fold line 412, separating the ply sections 408 and 404, and also separating the ply sections 406 and 402. Further, there is a tear line 414 (in the form of spaced perforations) extending parallel to the longitudinal fold line 412, and spaced a short distance from this longitudinal line 412 toward the edge 413 of the plys 402 and 404. There is an access and close flap portion 416 joined to the base ply 402 along a fold line 418.

To form the blank 400 into the sleeve in its preloading configuration, glue strips are applied at the locations shown in FIG. 36 prior to having the two plys 404 and 408 folded over onto the plys 402 and 406. These glue strips are two longitudinally extending glue strips 420 and 422 on opposite sides of the base ply 402, and also a single longitudinal glue strip 424 applied to the ply section 406. Also, there is the glue strip 426 (a pressure sensitive or moisture sensitive glue strip) applied to the closure and access flap 416. A short distance from the fold line 410, there is also a transverse glue strip 428.

It is believed to be evident from reviewing the prior text that the three glue strips 420, 422 and 428 define the pocket area 430 between the base ply section 402 and the cover ply section 404. The glue strip 424 simply holds the outer edges of the two ply sections 406 and 408 together to facilitate the process of incorporating the finished sleeve in the binding process.

Figure 38:
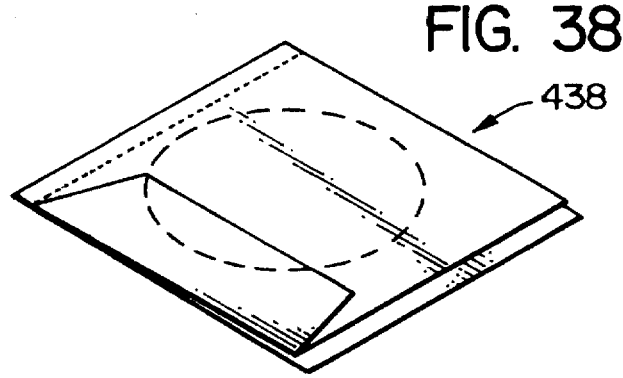
FIG. 38 is an isometric view of the sleeve/disc combination in a form to be incorporated in a gathering line for the stitch binding process, as shown in FIG. 37.

The two ply sections 404 and 408 are folded to be on top of, respectively, the ply sections 402 and 406. The finished preloaded sleeve is designated 432, and is shown in FIG. 36, where the two ply sections 408–406 lie in the same plane as the two ply sections 402 and 404. In this configuration, the preloaded blank 432 is directed through the disc inserting line, as shown previously herein, in FIG. 11, to have the disc 14 inserted therein. After the disc 14 is inserted, the closure flap 416 is folded over about one fold line 418, with the glue strip 426 bonding the flap 416 to the cover ply 402. At this time, the sleeve 432 with the disc 14 therein can be considered as having two sections, namely a sleeve section 434 made up of the two plys 402 and 404 and the flap 416, and a counter balance section 436 made up of the two plys 406 and 408. At the end of the disc inserting process, the sleeve section 434 and the counter balance sections 436 are folded relative to one another about the fold lines 412, so that, in the configuration shown in FIG. 36, the counterbalancing section is folded downwardly and under the sleeve section 434 to arrive at the configuration shown at 438 in FIG. 38. The configuration in 438 shall be termed the sleeve/disc package, and is designated generally as 438. The next step is to incorporate the package 438 into the stitch binding process to form the stitch bound magazine or book.

Figure 37:
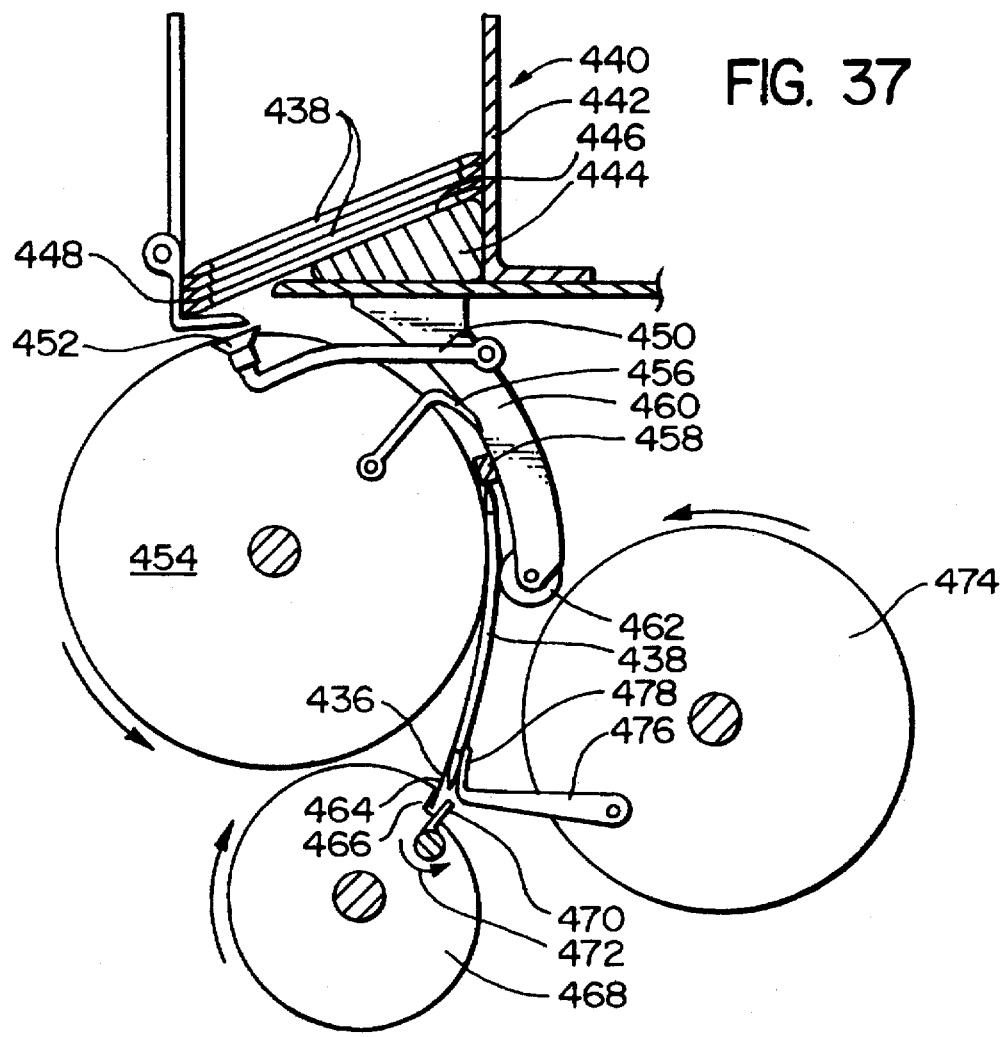
FIG. 37 is a side elevational view, partly in section, showing a stack of sleeves, as shown in FIG. 36, with the computer discs therein, stacked in a pocket member as sleeve/disc combinations, ready for being deposited into a gathering line for the stitch binding process.

Reference is now made to FIG. 37, where there is shown a plurality of the sleeve/disc packages 438 mounted in a pocket assembly 440. It can readily be seen that the pocket assembly 440 is substantially the same as that shown in FIGS. 14, 16 and 17. Accordingly, this will not be described in detail herein, except to state that there are containing walls 442, a bottom wedge member 444 to provide the slanted surface 446 and a release arm 448. Also, there are transfer arms 450, each having a suction cup 452 on the moveable end. There are a pair of transfer drums 454, and each transfer drum has a related clamping finger 456.

It is believed the manner in which the sleeve/disc packages 438 are transferred out of the pocket assembly 440 is evident from reviewing the discussion relevant to FIGS. 14 through 17, so this will not be described in detail herein. Thus, in FIG. 37, the sleeve/disc package 438 is shown having been carried by the drums 454 downwardly and thence upwardly along the backside of the drums 454 to engage stop members 458, carried on arms 460. There are guide rollers 462 which (as the name implies) guide the sleeve/disc package 438 upwardly toward the stop member 458. At the same time as the sleeve/disc package 438 is engaging the stop member 458, the clamping fingers 456, to permit the sleeve/disc package 438 to move downwardly.

It can be seen that a lower edge portion 464 of the aforementioned counter balance 436 of the sleeve/disc package 432 has moved to a location where it is engaged by radially extending surfaces 466 at the perimeters of the rotating drums 468. Also, retaining fingers 470 on the drums 468 are rotated as shown by the arrow 472 to grip the lower edge of the counter balance portion 436 of the sleeve/disc package 432.

Figure 39:
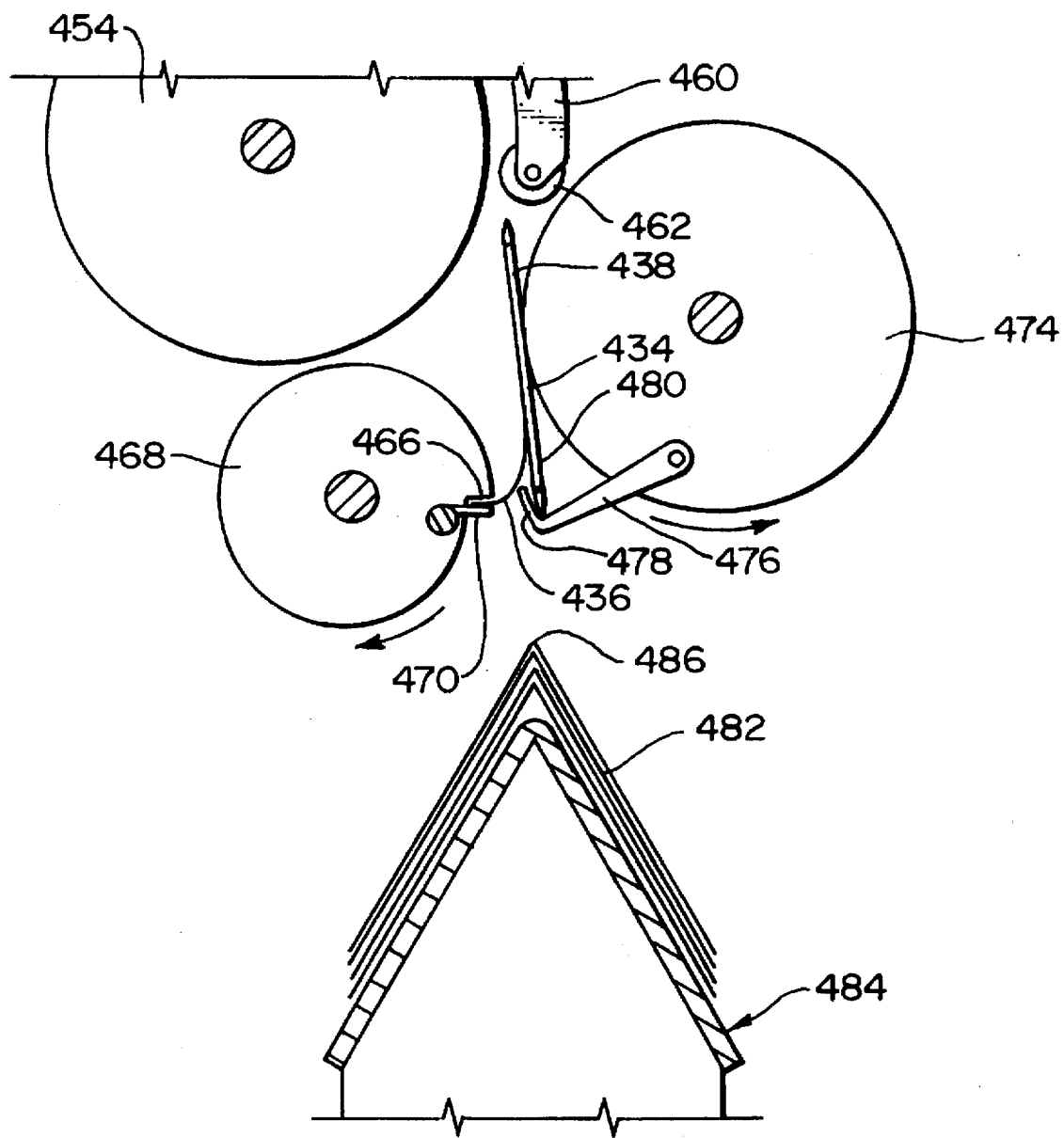
FIG. 39 is a side elevational view showing the lower part of the transfer station of the sleeve/disc packages, with one of the sleeve/disc packages about to be deposited onto the other signatures which have been deposited on the conveyor and the gathering line.

Reference is now made to FIG. 39, which shows the sleeve/disc package 438 dropping downwardly. The fingers 466 gripping the lower edge of the counter balancing sleeve section 436 are moving the entire package 438 downwardly. In the meantime, there are drums 474, each of which carries an arm 476 having an end finger portion 478 which engages the lower edge 480 of the sleeve/disc portion 434 as the package 438 is dropping downwardly.

As the drums 468 and 474 continue to rotate, so that the counter balance section 436 of the package 438 and the sleeve section 434 move away from one another, the package 438 drops onto the group of signatures 482 which are being carried by a conveying system schematically shown at 484. It is to be understood that the three sets of drums 454, 468 and 474 and the components associated there were, namely the clamping fingers 466, the arms 476 and the clamping fingers 456 are all conventional and are part of the standard stitch binding operation. In fact, one of the advantages of the present invention is that these components can be used in their present configuration, possibly with minor modifications. (However, the pocket assembly 440 has been modified from the conventional configuration as discussed previously in the description relating to FIGS. 14 through 17.)

The rest of the process proceeds as in the conventional stitch binding operation. The signatures 482 shown in FIG. 39 have previously been carried from pockets and deposited onto the conveying member 484 in substantially the same manner described above relative to the sleeve/disc packages 438.

When the sleeve/disc combination 438 drops onto the group of signatures 482, it is then carried through the rest of the conventional stitch binding operation. More specifically, the stitching or connecting members are applied at the crest of 486 of the group of signatures 482. Also, the group of signatures 482 plus the sleeve/disc package 438 could go to a subsequent station in the gathering line so that additional signatures 482, or possibly a cover member could be deposited upon the group of signatures 482.

It is to be understood that various modifications could be made to the present invention without departing from the basic teachings thereof. Also, it is to be understood that while the present invention has been shown used in combination with a perfect binding and a stitch binding, within the broader scope of the present invention, the present invention could be incorporated with other types of binding operations.

What is claimed:

1. A method of providing a book, sleeve and computer user disc product, comprising:

a. a book comprising a plurality of pages forming a book block having an inner binding edge portion, an outer edge portion opposite the binding edge portion, an upper edge portion, and a lower edge portion, said pages being joined to one another at the binding edge portion of the book block;

b. a sleeve comprising a base ply and a cover ply joined together at perimeter portions thereof to form a pocket, said sleeve having a binding edge portion, an outer edge portion, an upper edge portion, and a lower edge portion, the binding edge portion of the sleeve being joined to the book block at the binding edge portion of the book block;

c. the computer disc contained in the pocket of the sleeve, said method comprising:

a. providing a plurality of preloading sleeves having a base ply and a cover ply joined together in overlying relationship, and having perimeter portions thereof joined together to form a pocket, with at least one edge portion being an open edge portion;

b. providing a plurality of computer discs;

c. providing a plurality of prebound book pages having binding edge portions;

d. inserting each computer disc through the open edge portion of a related preloading sleeve and positioning said disc in the pocket of the related preloading sleeve to form one of a plurality of sleeve/disc packages, each having a binding edge portion;

e. placing said prebound book pages in an automated binding machine assembly in a pregathering position;

f. placing said sleeve/disc packages in said binding machine assembly in a pregathering position;

g. operating said machine assembly to gather the prebound book pages and said sleeve/disc packages together in a book block and sleeve/disc package combination and to join the binding portions of the prebound book pages and the sleeve/disc package to form the plurality of the book, sleeve and computer disc products, whereby said preloading sleeves, said discs and said book pages can be produced independently of one another, and combined with one another in the automated machine assembly of a book binding operation.

2. The method as recited in claim 1, wherein the book pages and the sleeve/disc package are bound to one another in a binding operation by adhesive being applied to the binding edge portions thereof.

3. The method as recited in claim 1, wherein said prebound book pages and said sleeve/disc package are joined together by forming said pages so that pairs of said pages are formed as one sheet, with said sheet having a middle binding portion interconnecting the two pages of the pair, said sheets being bound together at said binding portion in a stitch binding, said sleeve/disc package having a disc containing portion and a counter balancing portion joined together by a binding portion, the binding portion of the sleeve/disc package being bound to the binding portions of the sheets.

4. The method as recited in claim 1, wherein prior to inserting the discs into the preloading sleeves, said preloading sleeves are formed by providing a paper blank having two ply sections, applying adhesive to at least one of said ply sections and folding said ply sections against one another to bind edge portions of said ply sections to one another and form the pocket of the preloading sleeve.

5. The method as recited in claim 4, wherein at least one of said ply sections has an access and closure flap adjacent to the open edge portion, and after the disc is inserted into the preloading sleeve, the access and closure flap is closed over the open edge portion.

6. The method as recited in claim 5, wherein said access and closure flap has a moisture sensitive or pressure sensitive adhesive applied over an adhesive area of the access and closure flap, and said discs are inserted into said preloading sleeves by providing said preloading sleeves in a stack, and directing the preloading sleeves sequentially to a loading area, where the discs are inserted in the preloading sleeves, after which the access and closure flaps are sealed by folding the access and closure flap against the preloading sleeve.

7. The method as recited in claim 4, wherein said ply sections are folded against one another along a fold line to make a folded edge portion, and the folded edge portion of said preloading sleeve functions as the binding edge portion and is bound to said book pages.

8. The method as recited in claim 7, further comprising forming the ply sections with tear lines positioned adjacent to, but spaced from said fold line, whereby the sleeve in the book/sleeve and computer disc product can be separated from the binding edge portion of the sleeve.

9. The method as recited in claim 8, wherein adhesive is applied between said two ply sections adjacent to said tear lines, at a side of said two tear lines opposite from said fold line, whereby when the sleeve of the book, sleeve and computer product is removed, ply portions adjacent to the tear lines remain joined to one another to retain the disc in the pocket.

10. The method as recited in claim 9, wherein the open edge portion of the preloading sleeve is an edge portion of the sleeve other than the folded edge portion, and there is an access and closure flap joined to at least one of the plys at the open edge portion, said method further comprising closing said access and closure flap to form the sleeve/disc package.

11. The method as recited in claim 10, whereby said open edge portion is positioned on an opposite side of said preloading sleeve from said fold line portion, in a manner that in the book, sleeve and computer disc product, the access and closure flap is located at the outer edge portion of the book block.

12. The method as recited in claim 1, wherein an edge portion of the sleeve/disc package, other than the binding edge portion, has a trimmable foot portion extending beyond said perimeter edge portion, said method further comprising performing a trimming operation on said book block and said sleeve/disc package combination to remove said trimmable foot portion during a trimming operation.

13. The method as recited in claim 1, wherein said binding edge portion interconnects to said sleeve/disc package by means of a release line position along which said sleeve/disc package can be separated form said binding edge portion of the sleeve/disc package.

14. The method as recited in claim 1, wherein at least one of the perimeter edge portions of the sleeve in the sleeve/disc package is provided with a release line section which permits adjacent portions of the sleeve to be separated from one another to open said pocket, so that said disc can be removed from said pocket.

15. The method as recited in claim 1, wherein said sleeve in sleeve/disc package has one of said perimeter edge portions of the sleeve provided with a release flap which is connected to one of said base ply and cover ply portions and is adhesively bonded to an adjacent edge portion of the other of said base ply portion and cover ply portion, said release flap having at least one release line by which said flap can be separated to provide an opening to said pocket, with portions of said sleeve adjacent to said release line defining the opening to said pocket.

16. The method as recited in claim 15, wherein said release line comprises two spaced tear lines defining therebetween a tear strip, and said portions of the sleeve adjacent to the release line are separated from one another by removing said tear strip along said two tear lines from said sleeve to provide said opening to said pocket.

17. The method as recited in claim 1, wherein said plurality of pages are assembled by placing said pages at spaced pocket locations along a gathering line, and also placing said sleeve/disc package at one of said pocket locations along said gathering line, said method further comprising moving collecting station along said gathering line and moving pages from said pocket locations onto said collecting stations as the collecting stations move by said pocket locations, said method furthering comprising moving each of said sleeve/disc packages from the pocket location at which the sleeve/disc packages are located onto the collecting locations to form the book block and disc/sleeve combinations.

18. The method as recited in claim 17, wherein each of said book block and the sleeve/disc package are moved to a grinding location where spine edge portions of the related book block and sleeve/disc combinations are ground, and a bonding agent is applied to a ground spine edge portion of the book block and sleeve disc combinations.

19. The method as recited in claim 17, wherein the pages of the book block are removed from the pocket locations to the collecting stations by engaging pages at the pocket locations by a transfer member which pulls said pages while rotating said pages through an angular path of travel to deposit said pages at said collecting stations, said method further comprising moving said sleeve/disc packages by engaging said sleeves by one of the transfer members and moving the sleeve/disc package angularly to the collecting stations.

20. The method as recited in claim 19, wherein a pocket location at which the sleeve/disc packages are positioned has a bottom wall which slants from a horizontal alignment toward said one of the transfer members in a manner that the sleeve/disc package being removed from the pocket travels in substantial alignment with the bottom wall of the pocket at which these sleeve/disc packages are positioned.

21. The method as recited in claim 1, wherein the book pages in the book block and sleeve/disc package combination extend beyond the disc in the sleeve, said method further comprising, performing an edge trimming operation on said book block and sleeve/disc package combination by placing said book block and sleeve/disc package combination onto a base plate, with filler plate means positioned in a plane parallel to the disc in the book block and sleeve/disc combination, whereby the book block is positioned uniformly along a horizontal plane.

* * * * *